United States Patent [19]

Wu

[11] Patent Number: 5,107,444
[45] Date of Patent: Apr. 21, 1992

[54] METHOD AND APPARATUS FOR FLATTENING THREE-DIMENSIONAL SURFACES

[75] Inventor: Chien T. Wu, Grand Rapids, Mich.

[73] Assignee: Computer Design, Inc., Grand Rapids, Mich.

[21] Appl. No.: 243,616

[22] Filed: Sep. 13, 1988

[51] Int. Cl.$^5$ ............................................. G06F 15/20
[52] U.S. Cl. .................................. 395/119; 340/747; 340/750; 395/125
[58] Field of Search ................ 364/522, 521, 200 MS, 364/900 MS; 340/728, 729, 747, 750

[56] References Cited

U.S. PATENT DOCUMENTS

| | | | |
|---|---|---|---|
| 3,534,396 | 10/1970 | Hart et al. | 235/61.6 |
| 3,614,410 | 10/1971 | Bailey | 235/186 |
| 3,636,328 | 1/1972 | Korelitz et al. | 235/151.1 |
| 3,653,071 | 3/1972 | Hill et al. | 444/1 |
| 3,693,168 | 9/1972 | Halkyard et al. | 340/172.5 |
| 3,716,705 | 2/1973 | Newell | 235/151 |
| 3,732,557 | 5/1973 | Evans et al. | 340/324 |
| 4,058,849 | 11/1977 | Fitzgerald | 364/520 |
| 4,070,710 | 1/1978 | Sukonick et al. | 366/900 |
| 4,546,434 | 10/1985 | Gioello | 364/300 |
| 4,775,946 | 10/1988 | Anjyo | 364/522 |
| 4,800,380 | 1/1989 | Lowenthal | 340/750 |
| 4,825,391 | 4/1989 | Merz | 364/526 |
| 4,857,905 | 8/1989 | Ogawa | 340/748 |
| 4,888,713 | 12/1990 | Falk . | |

OTHER PUBLICATIONS

"Mapping Methods for Generating Three-Dimensional Meshes", by W. A. Cook and W. R. Oakes for Computers in Mechanical Engineering/Aug. 1982.

Excerpt #1 from Rogers book, Procedural Elements for Computer Graphics, pp. 354-362, McGraw-Hill, 1985.

Foley & VanDam article, "Fundamentals of Interactive Computer Graphics", Addison-Wesley Publishing Company (1982).

Primary Examiner—Gary V. Harkcom
Assistant Examiner—Phu K. Nguyen
Attorney, Agent, or Firm—Price, Heneveld, Cooper, DeWitt & Litton

[57] ABSTRACT

A method and apparatus for flattening a three-dimensional surface into a two-dimensional pattern piece extracts a three-dimensional mesh from the surface to define surface elements and maps these elements in groups to a flat plane where they are reassembled. The position of data points in the flat plane are recursively adjusted in order to cancel error and to provide an optimum solution. Tools are provided to the user to determine the correctness of the flattening process and to insert darts into, and make other modifications to, the resulting flat pattern in order to further optimize the result.

23 Claims, 21 Drawing Sheets

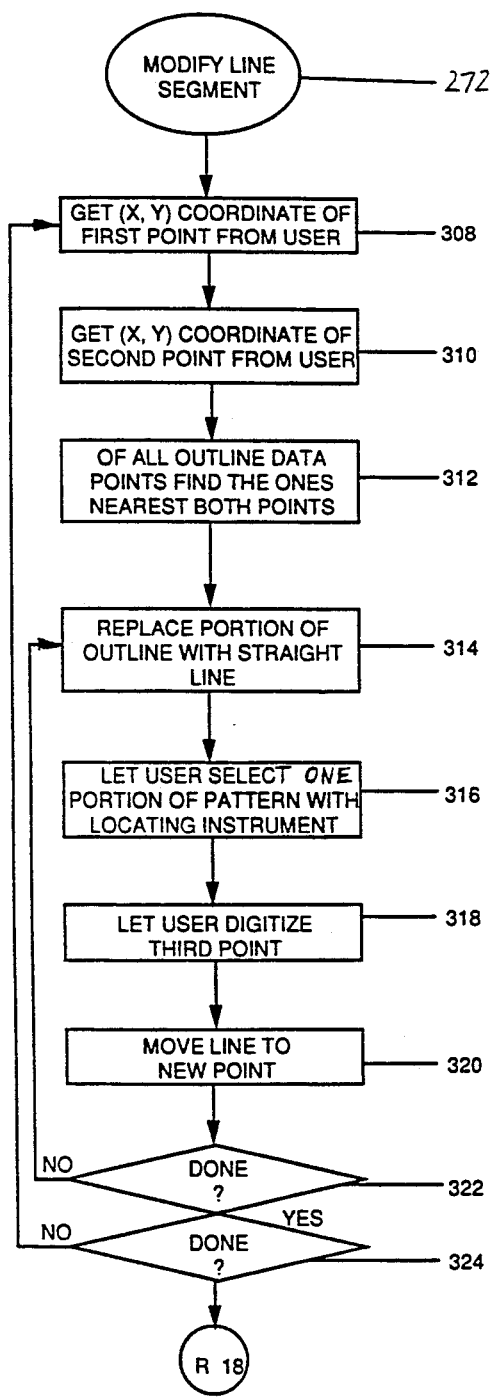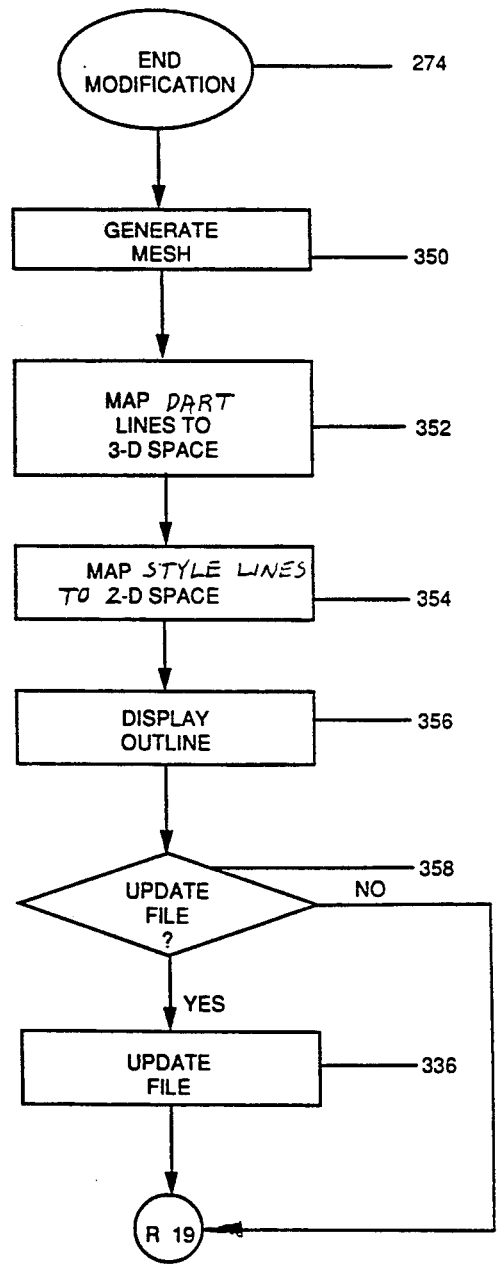
Fig 18
Fig 20

METHOD AND APPARATUS FOR FLATTENING THREE-DIMENSIONAL SURFACES

BACKGROUND OF THE INVENTION

This invention relates to computer-aided design (CAD) systems and specifically relates to a system and method for flattening three-dimensional surfaces into two-dimensional pattern pieces. The present invention has specific application to the apparel and footwear design industries.

In the apparel, footwear and upholstery design industries new products are conceived and designed in the context of a three-dimensional image which must ultimately be converted to flat, two-dimensional pattern pieces that, when assembled, will provide the three-dimensional object. Three-dimensional CAD systems have been developed to provide a tool for the designer to create the three-dimensional image of a product design and to effect modifications to the design. In addition, three-dimensional CAD systems may be inputted directly from a model of a design through a three-dimensional digitizer.

It is not a simple task, however, to convert a three-dimensional image into a two-dimensional flat pattern that is a true representation of the three-dimensional surface of the object. For three-dimensional surfaces that possess regions having substantial amounts of gaussian curvature, such as spheroidal surfaces, the flat pattern solution is not even developable in all regions. Even the optimum numerical solution will deviate from the true solution to the flattening problem in these regions. The result is localized compression or tension in the two-dimensional flat pattern piece in regions of the three-dimensional surface having substantial non-zero gaussian curvature.

Accordingly, it is an object of the present invention to provide a system and method that is capable of solving this vexatious problem.

SUMMARY OF THE INVENTION

The present invention provides an optimum solution to the flattening of a three-dimensional surface into a two-dimensional pattern. Because, as previously discussed, it is not possible to always provide a true solution when a surface has a region of substantial gaussian curvature, the present invention provides an indication to the user of the amount and distribution of localized tension and compression stress in the resulting pattern as well as other tools for evaluating the solution. In order to utilize the ability of the invention to generate an optimum solution and provide an indication to the user of the deviation of the solution from the true solution, the present invention further provides the user with tools for reducing the localized compression and stress in the resulting flat pattern piece. With the use of the tools provided by the present invention, the user may apply his or her creativity and experience to make modifications to the pattern piece. The modified surface may then be reflattened and the effect of the user-initiated modifications on the tension and compression stress distribution evaluated. Thus, while exhibiting a substantial sophistication in problem solution, the present invention recognizes the necessity of user-involvement and provides a "user-friendly" tool to enhance user-productivity, all for the purpose of obtaining a flat pattern piece that is an optimum solution to a three-dimensional surface flattening task.

The present invention flattens a three-dimensional surface from which a three-dimensional mesh is extracted. The mesh is composed of iso-parametric lines in the (U,V) parametric space of the surface. The present invention converts the four-sided mesh polygons into straight-line quadrilateral elements, maps the elements from three-dimensional space to a two-dimensional pattern plane and assembles the elements to a growing pattern. In areas where substantial gaussian curvature exists, the elements will become distorted when mapped to the 2-D plane and are not capable of assembly in this form because the sides of adjacent elements will not necessarily match up. The present invention overcomes this difficulty by distorting the dimension of each element in the two-dimensional plane to "force" it to fit in the necessary spot in the pattern. This distortion, however, creates a substantial amount of error in the developing pattern which, if not corrected, would accumulate to disastrous proportions. To correct this error, the present invention recursively, or iteratively, adjusts the location of the data points, which define the corners of the elements, in the flat pattern. This global iteration is recursively carried out every time a complete row of elements is added to the pattern and when the pattern is complete.

The global adjustment process examines the global tendency of each data point to move with respect to adjacent data points as the mapping and assembly process proceeds and compensates for this global drift. Because the process is applied iteratively, it is referred to as global iteration. Thus, it is seen that the present invention provides a system and method for flattening a three-dimensional surface which compensates for errors that develop in the flattening process.

In regions of the three-dimensional surface where very high gaussian curvature exists, the amount of element distortion that would be required to assemble the elements into a flat pattern would be so extensive that the elements would be distorted to a zero width and may even overlap in certain areas. This "crashing" of elements is overcome in the present invention by combining a number of individual small elements into a larger element prior to mapping and assembly. The large element may, for example, consist of a strip of small elements that make up one row of elements in the developing pattern. For the purpose of "disassembling" the three-dimensional surface, mapping the surface to the individual elements are ignored and only large elements are considered. The large elements are mapped and assembled with the sides of each added large element distorted to match the ones to which it is being joined. Global iteration is applied to the growing pattern to globally adjust the points defining the corners of the large elements in the same manner previously described. Once the flat pattern is assembled from large elements, the small elements are regenerated within the large elements in the pattern by the use of a two-dimensional mesh generator. The global iteration process is then applied to the entire pattern of individual small elements to provide a flat pattern that represents an optimum solution of the three-dimensional surface.

The use of large elements overcomes the problem of element "crashing" by providing elements that are large enough not to crash as a result of the gaussian curvature. An additional benefit of the present technique is that the construction of the pattern from large elements, followed by insertion of the individual elements is computationally substantially faster than flattening the surface in a single step using small elements.

Although the present invention provides an optimum solution to the flattening problem it cannot be guaranteed to be a true solution, especially in regions of high gaussian curvature. The present invention determines the deviation from a true solution by comparing the length of each side of each small element, called a link, in the three-dimensional image with the same link in the two-dimensional image. If the link is shorter in the two-dimensional image then localized compression exists and, if the link is longer, localized tension exists. The present invention determines the compression and tension stress for each link and displays this distribution of stress to the user. The display of stress is effected, in one embodiment of the invention, by a color bar on the screen displaying a range of hues representing the maximum value of tension and compression at opposite ends of the continuum of hues. The individual links in the two-dimensional pattern mesh are assigned a hue corresponding to the value of tension or compression in that individual link. The user will thus be apprised of the areas of high localized tension or compression and the absolute value of tension or compression at these areas.

If, after having reviewed the tension and compression distribution of the flat pattern produced by the invention, the user is satisfied with the results, the outline of the pattern piece may be stored in memory for subsequent recall or may be outputted to a numerically controlled pattern cutting device or pattern grading system. If, instead, the user is not satisfied the invention provides tools for the user to modify the pattern. The invention allows the operator to insert darts into the pattern in areas of high localized tension and compression stress. The dart is a cut in the pattern which is per se known in the apparel industry. The user may insert any number of darts using an indicating instrument such as a light pen or mouse. The dart lines are mapped back to the three-dimensional space and appear as style lines on the 3-D image of the surface which, per se, are also known in the apparel industry. After the user inserts the darts, the 3-D surface is reflattened and the user is apprised of the tension and compression stress distribution in the modified pattern. The darts may be manipulated until the user is satisfied with the results.

The invention provides additional tools for assessing the results of the flattening process and ones for making additional manually directed modifications to the resulting pattern piece. An additional tool for appraising the result of the flattening process is a function to measure the circumference and surface area of the resulting pattern so that these parameters may be compared with those of the 3-D surface to additionally judge the result. The user is provided with modification functions that adjust the outline of the pattern by moving individual point and line segments of the pattern outline. The user is also provided an additional function that applies global iteration to the flat pattern as often as desired.

The present invention provides a system and method for flattening three-dimensional surfaces which is capable of further adaptation to enhance its utility. For example, by determining the distribution of tension and compression stress in the pattern, the present invention could be further enhanced to consider the stress tolerance of the material that will implement the three-dimensional design in order to determine if the material is capable of accommodating the absolute level of the tension and compression stress without modification. These and other related objects, advantages and features of this invention will become apparent upon review of the following specification in conjunction with the drawings.

BRIEF DESCRIPTION OF THE DRAWINGS

FIG. 18 is a flow chart illustrating the "modify line segment" function of the present invention;

FIG. 20 is a flow chart illustrating the "end modification" function of the present invention.

DESCRIPTION OF THE PREFERRED EMBODIMENT

Figure 2:
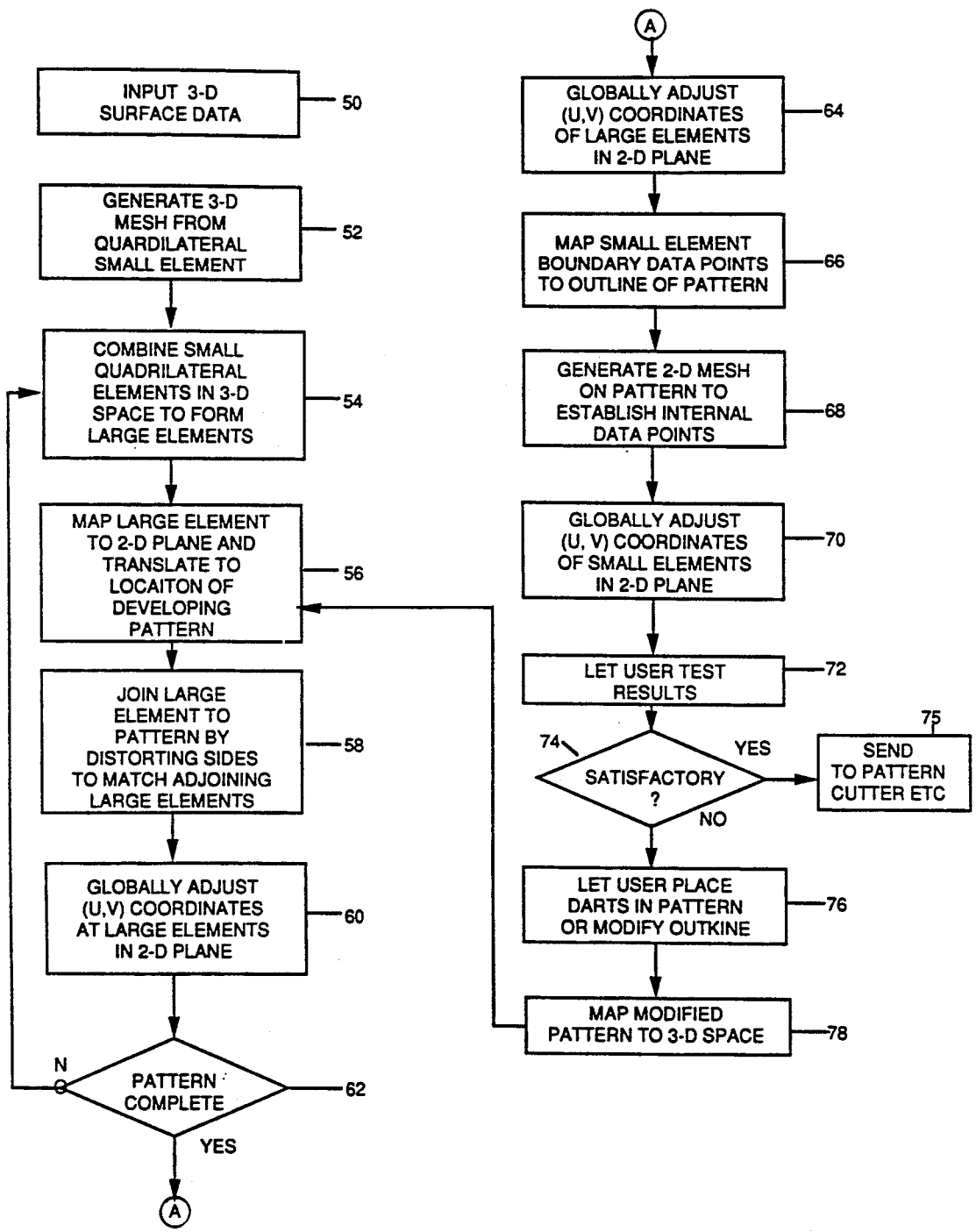
FIG. 2 is a flow chart illustrating one aspect of the present invention.

FIG. 2 illustrates in block diagram form the general organization of the preferred embodiment, it being understood that the user may enter and exit the system at various steps and repeat steps as desired. A three-dimensional image is inputted (50) to a temporary memory of the system through a digitizer 38 or by retrieval from a hard disk 36. The three-dimensional image of an object, such as an item of apparel, will be composed of individual parts such as sleeves, fronts, yokes, etc. The next step is to separate the parts in the three-dimensional image by polylines and to generate (52) a mesh within each part image. Although the object is defined in three-dimensional space, the image of the object is displayed on a two-dimensional display such as a CRT 26. The mesh is a gridwork of intersecting horizontal and vertical lines forming a plurality of quadrilaterals or elements, which define the topology of the object in (U,V) coordinates. The mesh provides a perspective to the image to present it in three-dimensional form although it is displayed in two-dimensional form. The generation of three-dimensional meshes is well-known in the art and reference is made to Cook, W. A. and Oakes, W. R. "Mapping Methods for Generating Three-Dimensional Meshes", *Computers In Mechanical Engineering*, August 1982, p. 67.

The system combines (54) a plurality of quadrilateral elements in the 3-D space to form a "large element." The large element may include any number of horizontal rows and vertical columns of small elements, as defined by the user, but in the preferred embodiment is a single horizontal row u of elements in the resulting flat pattern. Each individual large element from the 3-D space is mapped (56) to a two-dimensional plane utilizing bilateral conformal mapping techniques and is translated in the two-dimensional plane to the location of the developing pattern. The large element is joined (58) to another large element on the developing edge of the pattern. Because the sides of the large element and the large element to which it is being joined will not be identical, if the elements are mapped from a region of the 3-D image having substantial non-zero gaussian curvature, the side of the added large element is distorted to match the side of the large element to which it is being joined.

The distortion of the elements forming the pattern induce error to the pattern, which is capable of accumulating to an unacceptably large amount. To reduce this error, a technique is applied to the developing pattern after an entire row of large elements are joined to the pattern. The technique is to globally adjust (60) the coordinates of the data points defining the large elements in the 2-D plane. Each data point is globally surrounded by eight other data points; two horizontally, two vertically and four diagonally spaced from the particular point. The lines between adjacent points are defined as links. If the relative or global position of a particular data point changes from the 3-D image to the 2-D plane, the net length, in each direction, of the adjoining links will increase or decrease after the mapping. The global adjustment 60 will recursively compare the net length in each direction of the links globally surrounding each data point in the 3-D space with that in the 2-D space. If the comparison indicates that the data point has shifted in one direction, this operation will globally adjust the position of that data point to the opposite direction. When the last large element has been mapped and assembled to complete the pattern (62), the system will again recursively globally adjust (64) the coordinates of the data points defining the large elements in the 2-D plane to further reduce the error in the flattening process.

With the pattern fully assembled of large elements, the system will map (66) the small element data points around the boundary of the large elements from the 3-D surface to the 2-D pattern. A mesh generator will generate (68) a 2-D mesh on the pattern, utilizing the mapped data points, to establish the internal mesh data points in each large element. Because the internal data points of the newly-generated 2-D mesh will not be guaranteed to match those of the 3-D image, especially in places of high gaussian curvature, the system will recursively globally adjust at 70 the (U,V) coordinates of the small elements in the 2-D plane by a comparison with the global position of the data points of the small elements on the 3-D surface.

The system will, at this point, provide an optimum flattening of the 3-D surface to form a 2-D pattern piece. While the solution may be optimum, a significant amount of tension or compression stress may reside in the pattern in areas of high gaussian curvature in the 3-D object. The system provides a plurality of tools 72 to let the user test the resulting pattern to determine how optimal of a fit has been generated. One such tool is a means for calculating the residual tension or compression stress in each link, defined as the difference between the length of each link in 3-D space and the 2-D plane, with the tension and compression stress distribution being displayed to the user. In the preferred embodiment, the maximum amount of tension and compression are numerically indicated at opposite ends of a color spectrum and each link in the 2-D mesh is colored a hue from the spectrum indicative of the amount of tension or compression in that link. Another tool provided to the user is means for measuring the circumferential length and area of the resulting pattern so that these parameters may be compared with those of the 3-D surface object.

If the user determines at 74 that the results are indeed satisfactory, the pattern may be sent (75) to a NC cutter 46, a pattern grading system 48 or to storage on hard disk 36. If the results are not satisfactory, the system provides additional tools to let the user place darts (76) in the pattern in areas of high local stress or compression in order to reduce the amount of tension or compression by freeing the portion of the pattern that bounds the darts to move without constraint. The user may identify as many darts as desired and position the darts as deemed appropriate. The system additionally lets the user modify the outline of the pattern using specific tools to move data points and line segments of the pattern piece outline. After the user has placed darts in the pattern or modified the pattern outline at 76, the system will map 78 the pattern containing the darts and the modifications back to the 3-D space, where the darts will appear as style lines in the apparel. The flattening process will be repeated (56–74) except that in steps 56, 58, 60 and 64 sub-surface of the 3-D surface, as established by the darts, are processed rather than large elements. This procedure may be repeated until the user is satisfied with the results.

A. Description of the Hardware

Figure 1:
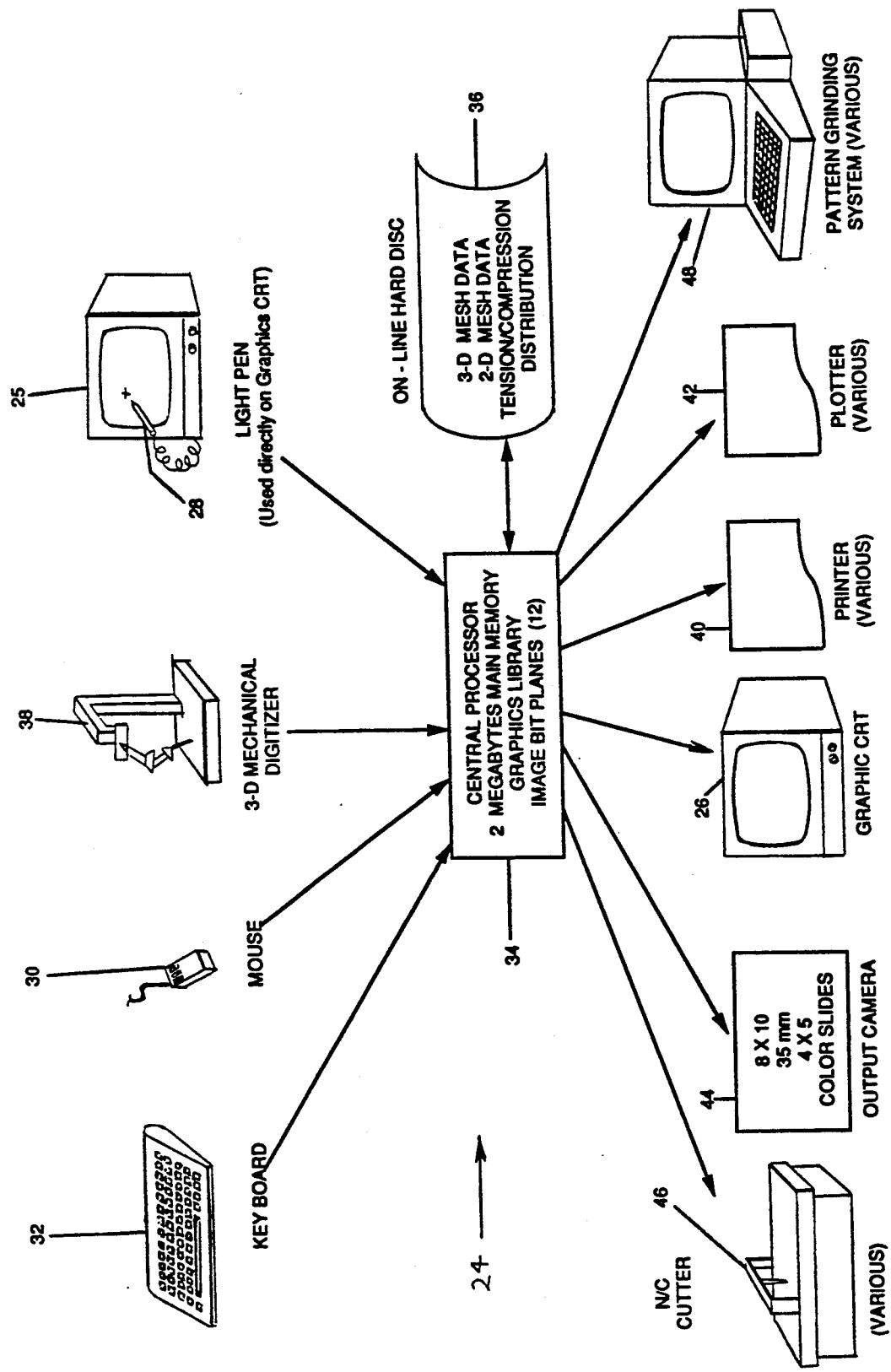
FIG. 1 is an illustration of a CAD hardware system useful in the present invention.

Referring now specifically to the drawings, and the illustrative embodiments depicted therein, the hardware requirements to support the present invention are basically those needed to support a standard three-dimensional CAD system. As illustrated in FIG. 1, CAD system 24 includes a graphic visual input/output device, such as CRT 25 and 26, with a standard light pen 28 and mouse 30 used as locating instruments, a keyboard 32, a central processing unit 34 and a data storage unit 36, which is preferably a hard disk storage unit. Light pen 28, mouse 30 and keyboard 32 are input devices for CPU 34. Input may additionally be provided from a three-dimension laser or mechanical digitizer 38. The output of system 24 may be directed to a graphic CRT 26, which is a high resolution 768 by 1024 pixels, a printer 40, plotter 42, output camera 44, numerically controlled cutter 46 and a pattern grading system 48.

The central processing unit 34 should support floating-point mathematical computation required for the preferred embodiment of the invention. At least two display buffers are required to dynamically present the growing flat pattern being developed by the system and at least one other image, such as the three-dimensional image or previously completed pattern pieces. Central processing unit 34 should have a minimum of two megabytes of resident memory with 170 megabyte storage capability in hard disk 36 to provide adequate storage of the data files supporting the three-dimensional software system, including the mesh data points of the three-dimensional image, the mesh data points of the two-dimensional pattern and the tension and compression stress distribution for multiple patterns.

An example of a suitable system 34 is a Silicone Graphics, Inc. IRIS workstation utilizing the Unix operating system developed by American Telephone and Telegraph, Inc. and a Silicone Graphics, Inc. standard graphics software system.

B. Description of the Software

In providing a system for flattening a three-dimensional surface into a two-dimensional pattern, the software is divided into three groups of function. The first group is a set of functions for initially flattening surfaces, retrieving pattern pieces that have previously been flattened, displaying tension and compression distribution in the flat pattern pieces, measuring the area or boundary length of the flat pattern pieces, and sending the flat pattern pieces to an output device. The second group is a set of functions for defining, generating, storing and retrieving darts in previously-flattened pattern pieces. The third group is a set of functions for initiating modification to previously-flattened pattern pieces, moving data points and line segments of a pattern outline, applying global iteration to the outline and terminating modification to the outline.

In the preferred embodiment, the present invention is utilized in combination with a menu-driven computer system 24. In invoking the present invention, the user will be provided with a menu having the following choices:

| | |
|---|---|
| "FLAT": | Flatten the surface without darts |
| "DART": | Flatten the surface with the application of darts |
| "MODIFY": | Reflatten a previously-flattened surface or manually modify a pattern piece |

Figure 3:
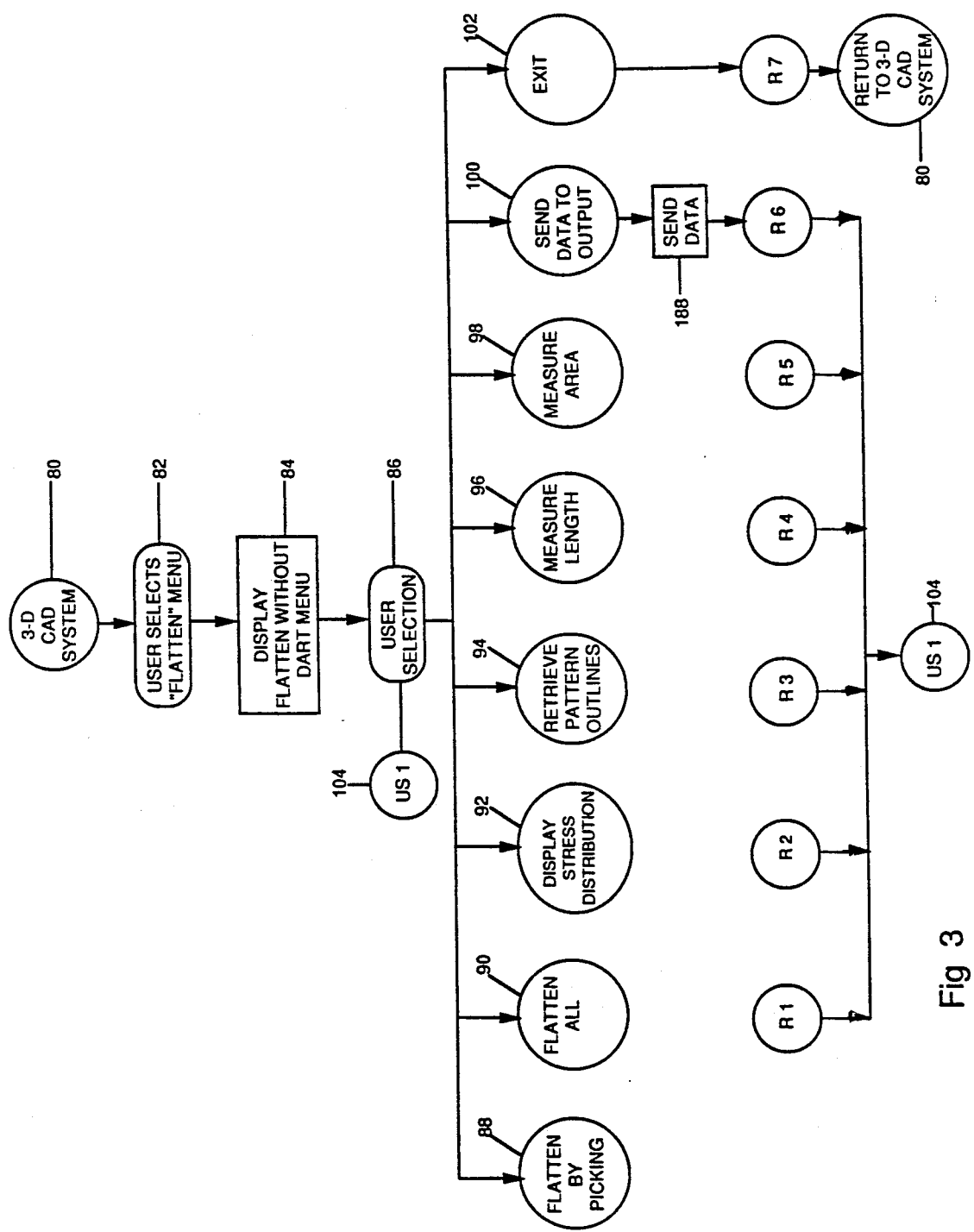
FIG. 3 is a flow chart illustrating the pattern flattening without darts function of the present invention.

FIG. 3 illustrates the main flow chart for the flattened surface without darts function, and outlines a function that allows the user to select various sub-functions for performing the initial flattening of a surface, and testing the resulting pattern, from a menu displayed on the system. The function, as a whole, is invoked from the exits to standard three-dimensional computer-aided design system software 80. Once invoked from the three-dimensional CAD system 80, the function illustrated in FIG. 3 allows the user to select (82, 84, 86) from a menu any of the individual sub-functions 88–100 associated with initial flattening of a surface. Referring to the flow chart, note that there are seven sub-functions 88–100 that may be invoked following a user selection, plus an "exit" 102 function. Each of the sub-functions 88–100 execute some portion of the initial flattening and testing process. Once each of these sub-functions 88–100 finishes its task, control is returned to the flattening without darts function illustrated in FIG. 3, indicated by the labels R1–R6. Control is then passed back to the menu selection (US1) 104 so that the user may proceed to the next sub-function. When the "exit" function is selected, this function terminates and control passes back to the three-dimensional CAD system 80.

Figure 4:
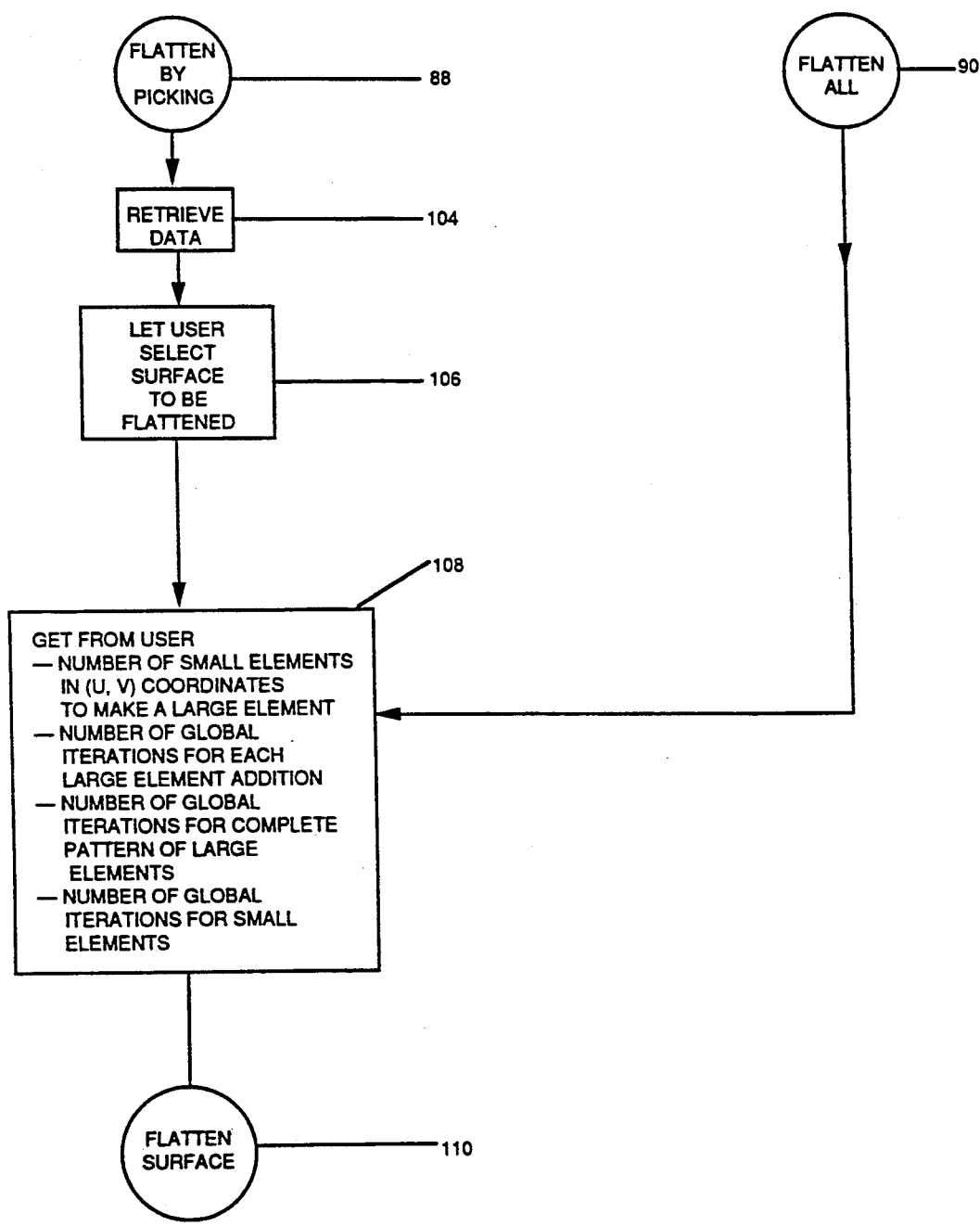
FIG. 4 is a flow chart illustrating the "flatten by picking" and "flatten all" input functions of the present invention.

FIG. 4 illustrates the "flatten by picking" 88 and flatten all 90 sub-functions. The flatten by picking sub-function permits the user to flatten one or several surfaces of an object part by selecting the desired surfaces with a locating instrument such as light pen 28 or mouse 30. The flatten all sub-function allows the user to flatten the entire surface of the part. The flatten all sub-function is appropriate for flattening a surface for the first time.

When the user selects the "flatten by picking" sub-function 88, the function first retrieves (104) and places in separate files, existing flat pattern data for the three-dimensional object parts. The three-dimensional object is displayed on graphic CRT 26 and the function lets the user select at 106 one or more surfaces to be flattened. A menu is then displayed (108) to prompt the user to select the number of small elements in the (U,V) coordinate system that will define a large element, the number of global iterations to be recursively applied to the assembly of each large element to the growing pattern, the number of global iterations to be recursively applied to the complete pattern of large elements and the number of global iterations to be recursively applied to the complete pattern small elements. If the "flatten all" sub-function is selected, the menu 108 is displayed to prompt user-selection of parameters.

Figure 5A:
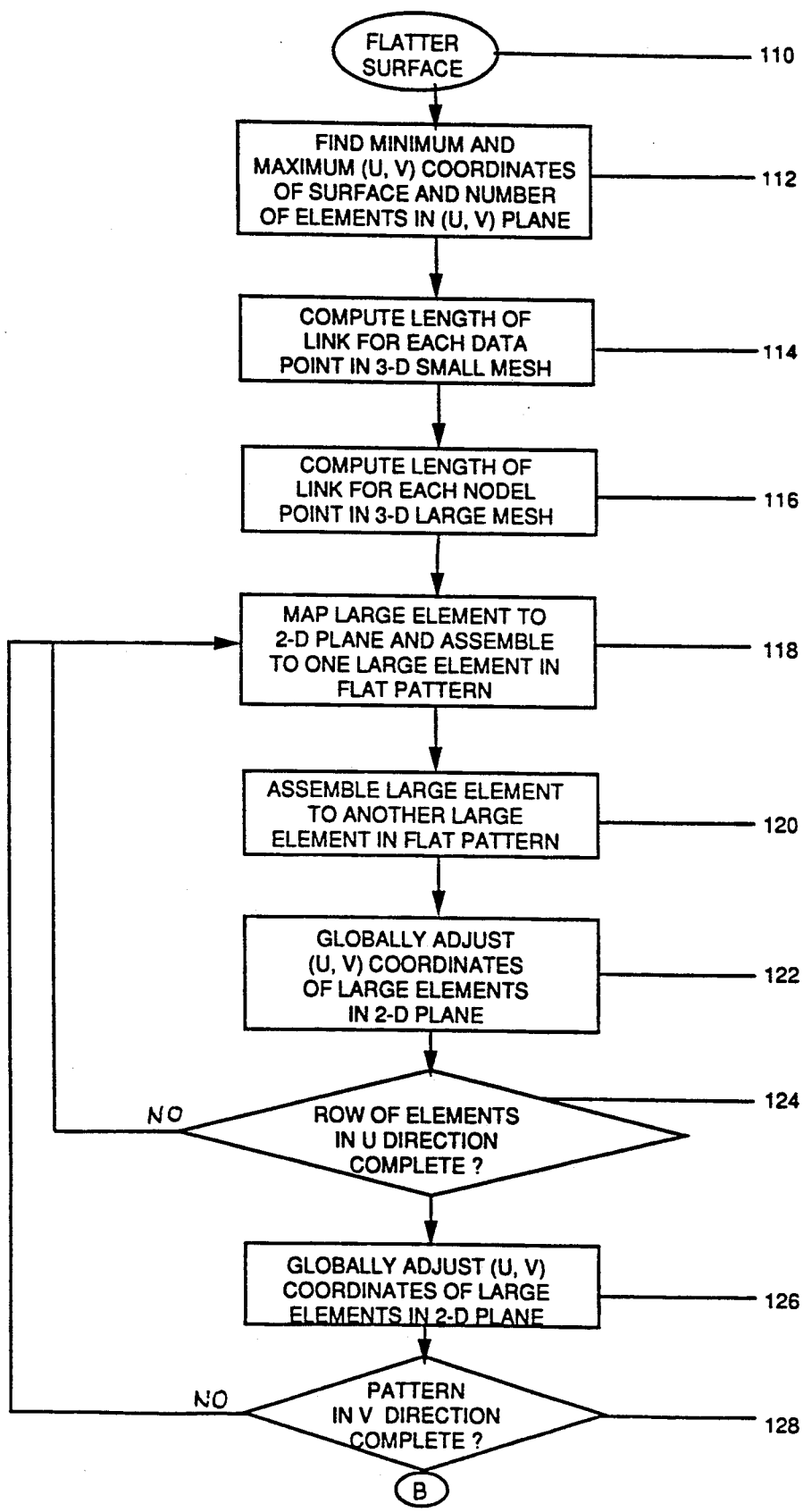
FIGS. 5a and 5b are flow charts illustrating the "flatten surface" function of the present invention.
Figure 5B:
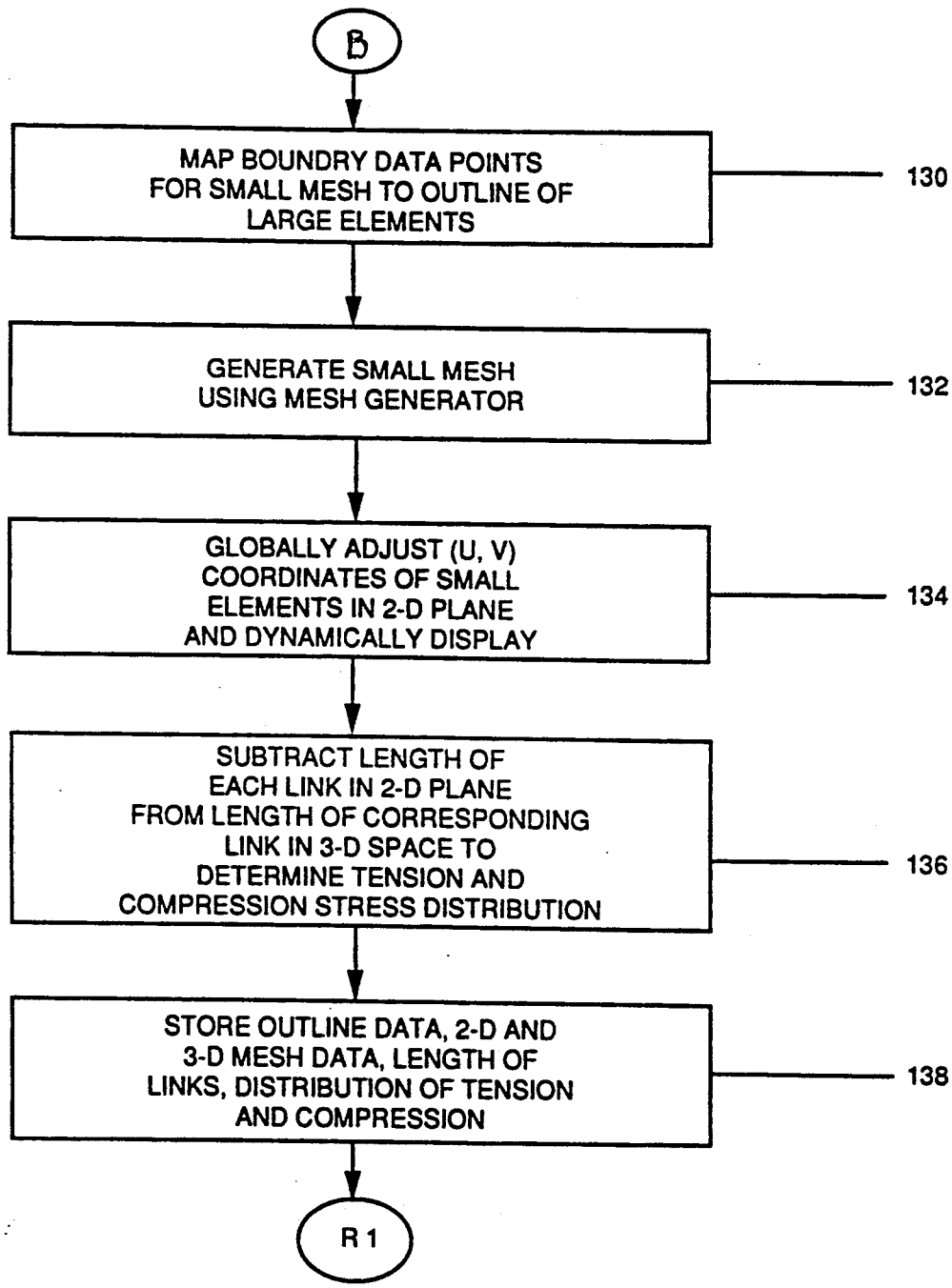

The flattening function 110 is performed as illustrated in FIGS. 5a and b. The function 110 finds (112) the minimum and maximum (U,V) coordinates of the surface and the number of small elements for that surface in the (U,V) space. The function then computes (114, 116) the length of the links between each data point and the eight adjacent data points in the 3-D small mesh and the length of the links surrounding each nodal point in the 3-D large mesh. If the user-defined large mesh is square, the large mesh diagonal link is calculated as a multiple of the length of the small mesh diagonal link and if the large element is not square, the diagonal is calculated by interpolation.

The function then maps (118) one large element, by bilinear conformal mapping from 3-D space to the 2-D plane, and assembles one side of the mapped large element to a side of a large element in the pattern by translating the element to the growing pattern and distorting one side of the added large element, if necessary, to conform to the side of the large element to which it is being joined. The large elements will be added to the pattern in the same manner that a brick wall is assembled and, therefore, must be joined on two sides to existing elements. Thus, the function will assemble at 120 a second side of the large element to the flat pattern by distorting the length of that side if necessary.

The function will then globally adjust (122) the position of the (U,V) coordinates of the data points at the corners of the large elements in the two-dimensional plane by calculating the net length, in each direction, of the surrounding links in both the three-dimensional space and the two-dimensional plane and adjusting the position of the respective data points in the two-dimensional plane opposite the direction that the links have "elongated" or "shortened". The data points are globally adjusted recursively according to the parameter selected by the user at 108. The function of globally adjusting the coordinates of elements, or global iteration, will be explained in more detail in association with FIG. 19. The function determines at 124 whether the added large element completes a row of large elements in the U direction. If not, additional large elements are locally assembled to the growing pattern (118, 120, 122) until a row of elements in the U direction is complete.

When it is determined (124) that a row of elements in the U direction is complete, the function again recursively globally adjusts (126) the coordinates of the large elements in the entire growing pattern according to the parameter selected by the user at 108. The function then determines at 128 whether the pattern is now complete in the V direction. If not, additional large elements and rows of large elements are mapped and assembled (118, 120, 122, 124, 126) to the pattern until it is determined that the pattern is complete.

Once all large elements have been assembled into a complete flat pattern, the flattened surface function then maps (130) the small mesh data points on the boundary of the large elements on the 3-D surface to the outline of the large elements in the 2-D plane by bilinear conformal mapping. A two-dimensional mesh generator is utilized to generate (132) the interior data points of a two-dimensional mesh on the pattern according to the small mesh data points mapped to the pattern large elements. The resultant mesh will contain internal data points that are not precisely coincident with the original small mesh data points on the 3-D surface, especially at locations of high gaussian curvature. The function will therefore globally adjust (134) the (U,V) coordinates of the small elements in the 2-D plane, in the same manner that the large elements were globally adjusted, by comparing their position relative to surrounding data points with the position of respective data points on the 3-D surface. The global adjustment 134 is recursively carried out according to the parameter specified by the user at 108.

Guided by the parameters entered by the user at 108, the flatten without darts function has now determined an optimum two-dimensional pattern for the three-dimensional surface. The function will then calculate at 136 the tension and compression stress distribution for the pattern. This is accomplished by comparing the length of each link in the resulting two-dimensional plane with its length in the three-dimensional space and determining by what amount the link is shorter (compression) or longer (tension). The data generated by the flatten function, including the outline information, the three-dimensional and two-dimensional mesh data, the length of the links, and the tension and compression stress distribution are stored (138) in a file.

Figure 6:
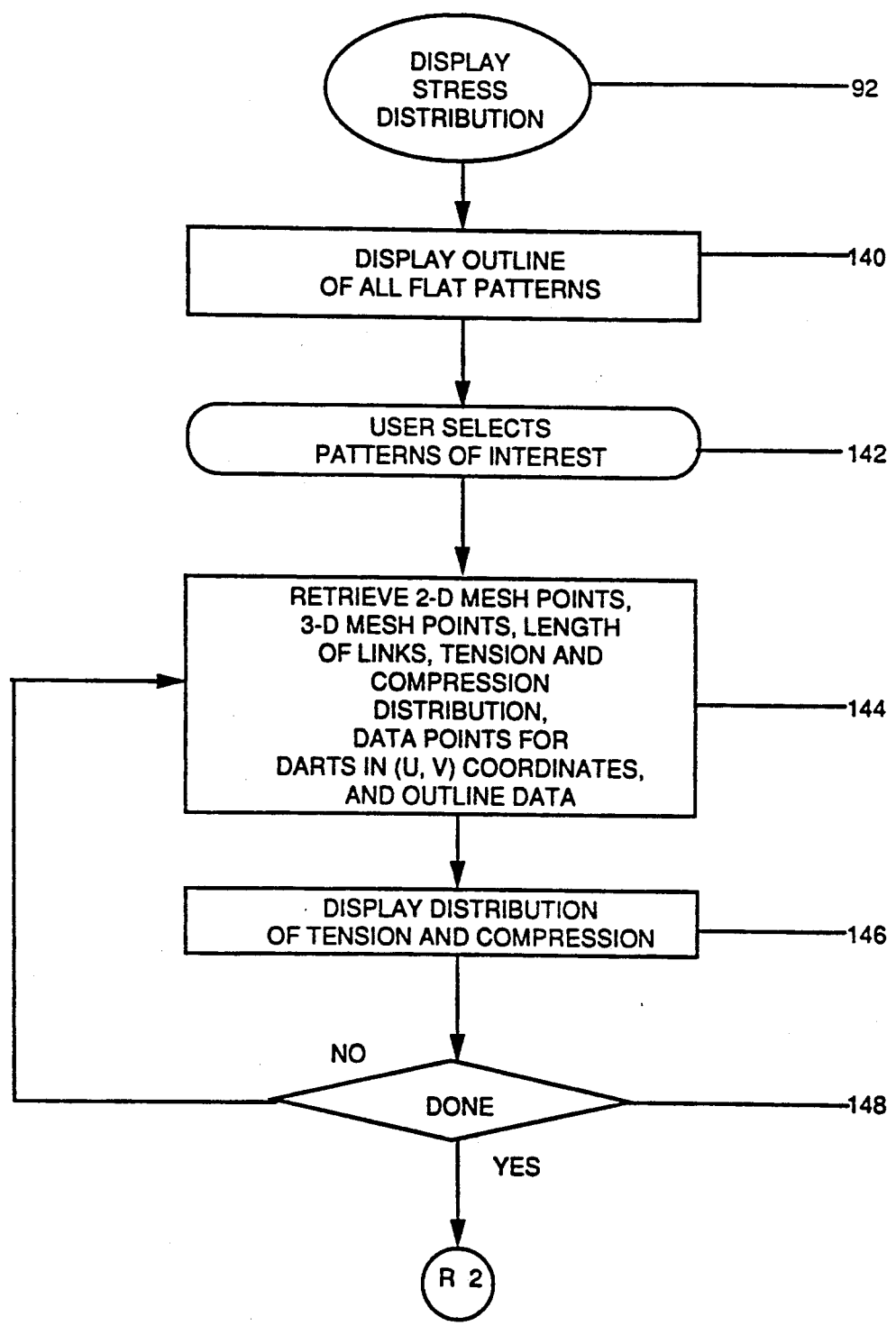
FIG. 6 is a flow chart illustrating the "display stress distribution" function of the present invention.

Once the user has flattened a particular surface, the present invention provides tools for assisting the user in determining whether the resulting flat pattern is satisfactory. FIG. 6 illustrates the flow chart for the "display stress distribution" function. When this function is selected, the outline of all of the surfaces that have been flattened into patterns are displayed (140) on CRT 26. When the user selects (142) a pattern of interest, the system retrieves (144) from memory the data on the 2-D and 3-D mesh points, the length of the links, the tension and compression distribution, the data points for darts, if any, in (U,V) coordinates and the outline of the pattern. The function then displays (146) the tension and compression distribution by imposing a color hue on each link in the 2-D mesh and displaying a color line indicating the significance of the colors and the absolute value of the maximum compression and stress. The function then determines at 148 whether additional patterns were selected by the user and if additional patterns were selected, the function displays (144, 146) the tension and compression distribution for these patterns.

Figure 7:
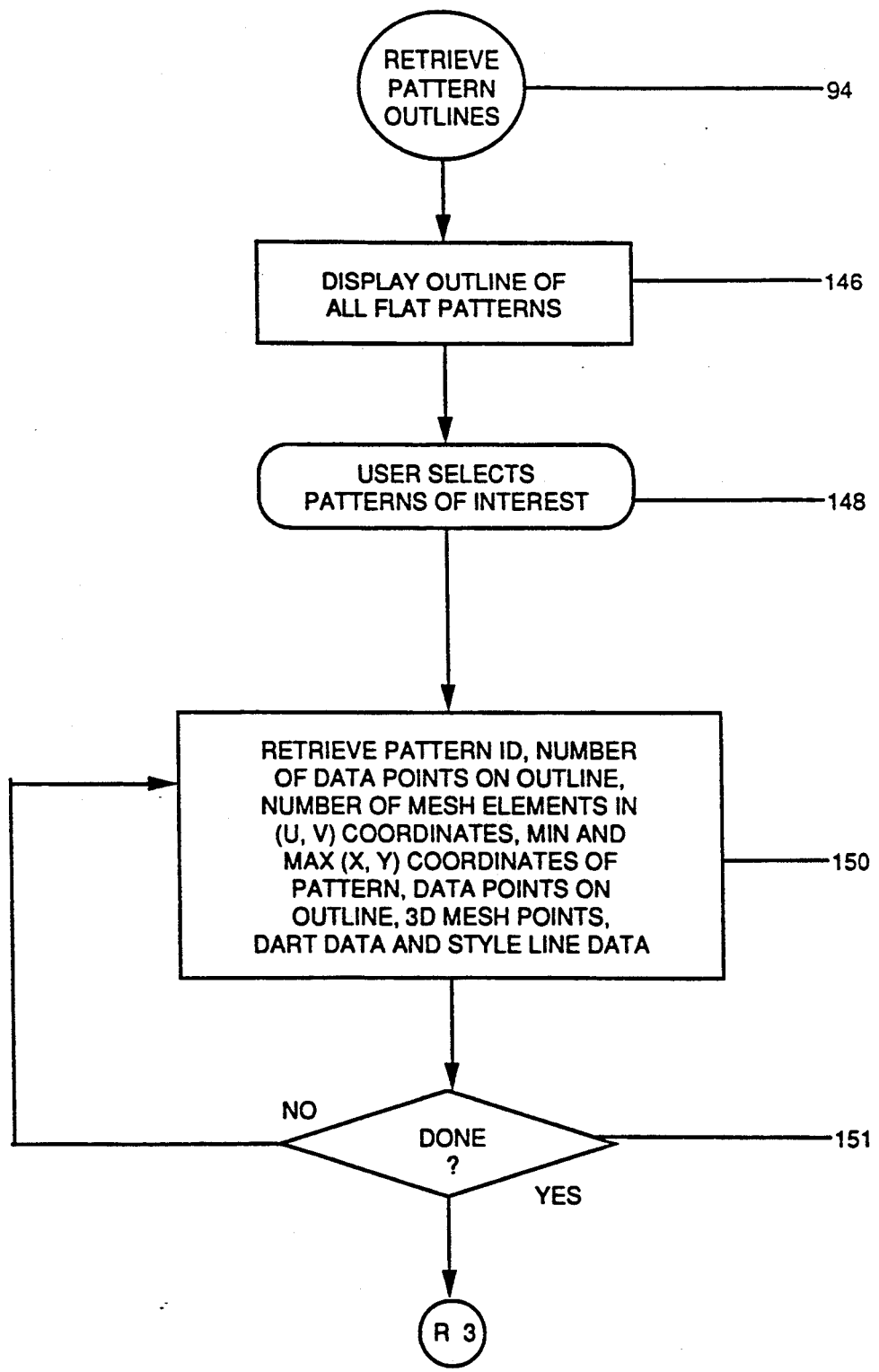
FIG. 7 is a flow chart illustrating the "retrieve pattern outlines" function of the present invention.
Figure 8:
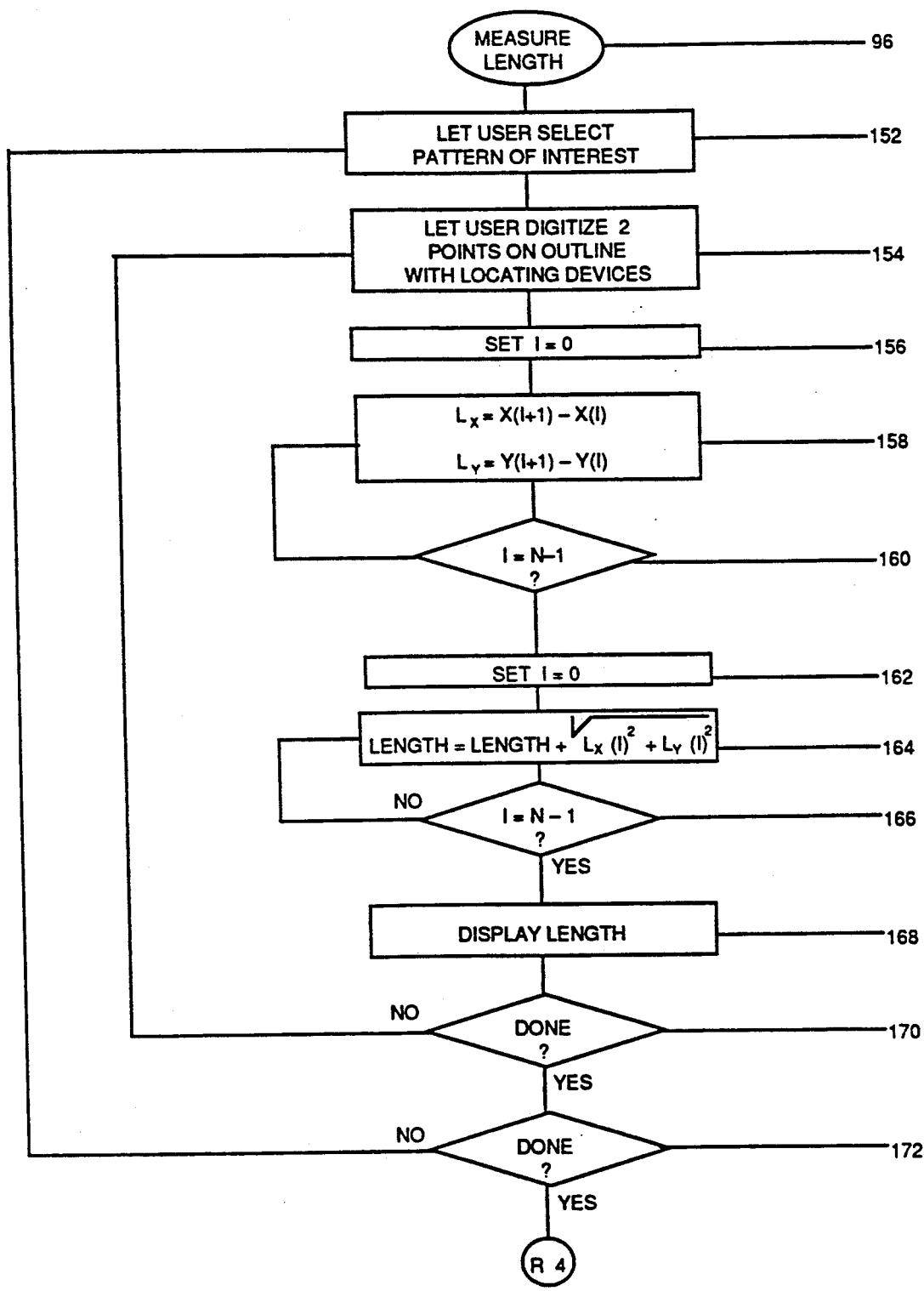
FIG. 8 is a flow chart illustrating the "measure length" function of the present invention.
Figure 9:
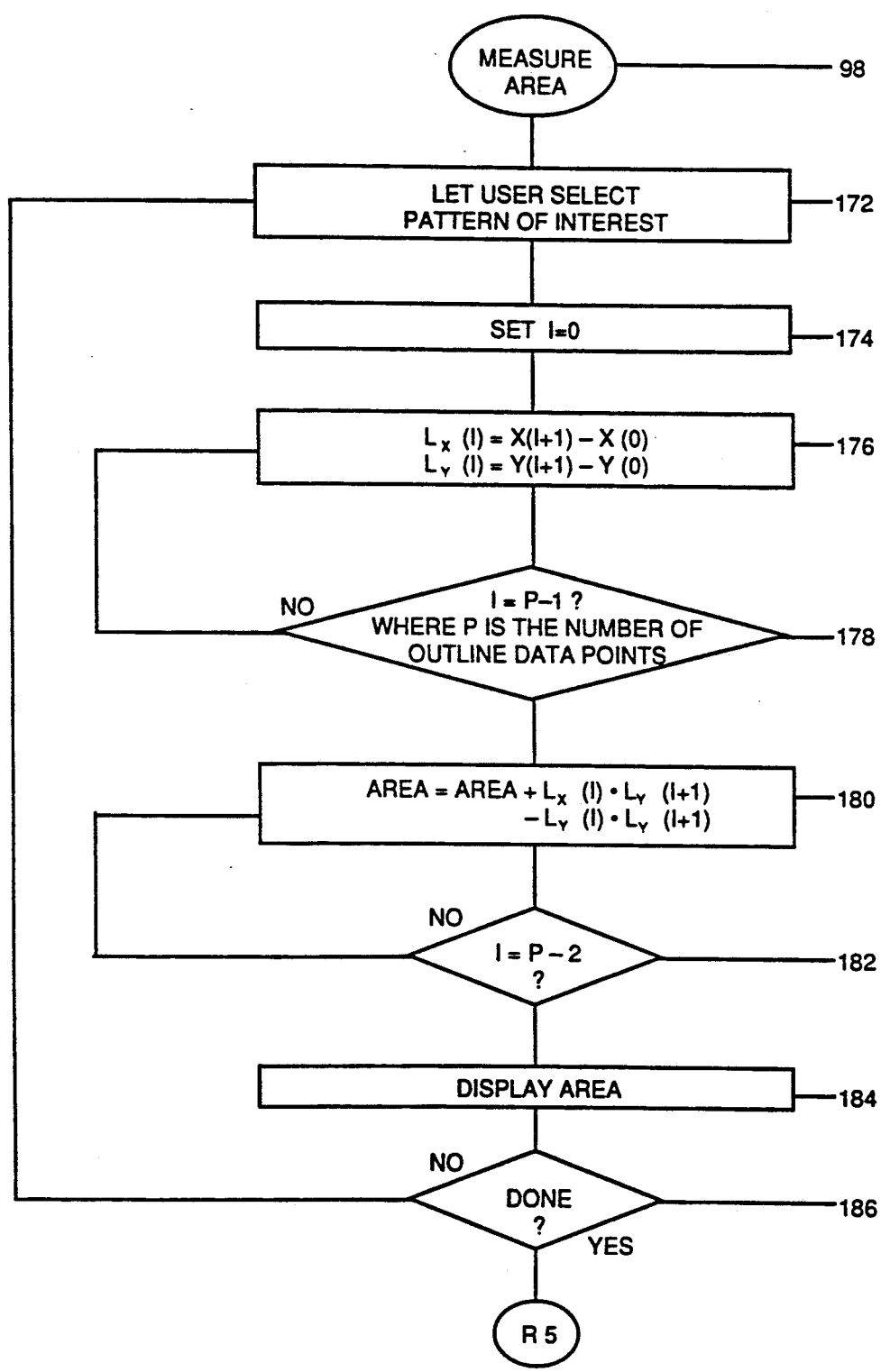
FIG. 9 is a flow chart illustrating the "measure area" function of the present invention.

FIG. 7 illustrates the flow chart for the "retrieve pattern outlines" function which allows the user to select a particular pattern and test that pattern by measuring its circumferential length and area to compare the length and area with that of the 3-D surface. When the "retrieve pattern outlines" function is selected, the function displays (146) the outlines of all patterns that have been produced as a result of the flattening function and allows the user to select (148) with a locating instrument one or more patterns of interest. For each pattern selected by the user, the function retrieves (150) the pattern ID, the number of data points on the outline, the number of mesh elements in (U,V) coordinates, the minimum and maximum (X,Y) coordinates of the pattern, the actual data points on the outline, the 3-D mesh points and any dart and style line data. After the patterns selected by the user at 148 are retrieved, the user may wish to select the "measure length" function, the flow chart of which is illustrated in FIG. 8, or the "measure area" function, the flow chart of which is illustrated in FIG. 9.

If the "measure length" function is selected, the user selects (152) a pattern of interest and digitizes (154) starting and ending points of interest on the pattern outline using a locating device such as light pen 28 or mouse 30. The function then sets a software counter 156 to 0 and calculates (158) the X and Y components of the distance between two adjacent data points on the pattern outline between the starting and ending points. Counter 156 is indexed and the calculation 158 is repeated until the function determines at 160 that the components of the distances between the length of all line segments along the selected portions of the outline have been calculated. The function then sets a software counter 162 to 0 and compiles (164) the length of the outline portion by summing the length of the line segments. When the function determines at 166 that the calculation is complete, the result is displayed (168) on display 26 and it is determined (170, 172) whether the user wishes to digitize another set of starting and ending points on the outline or measure the length of another pattern of interest.

The "measure area" function lets the user select (172) a pattern of interest. The function then sets a software counter 174 to 0 and calculates (176) the distance between each outline data point and the initial data point. When the function determines at 178 that all of the lengths have been calculated, the function calculates (180) the area by summing portions of the area. When the function determines (182) that all of the areas have been combined, the area is displayed (184) and the function determines (186) whether the user desires to select additional patterns.

Referring to FIG. 3, if the user selects (86) the "send data to output" function 100, the send data function 188 sends data to the designated output device such as camera 44, cutter 46 or pattern grading system 48. If the results of the flatten without darts procedure is not satisfactory, the user may select the "exit" function which passes control back to the three-dimensional CAD system 80.

Figure 10:
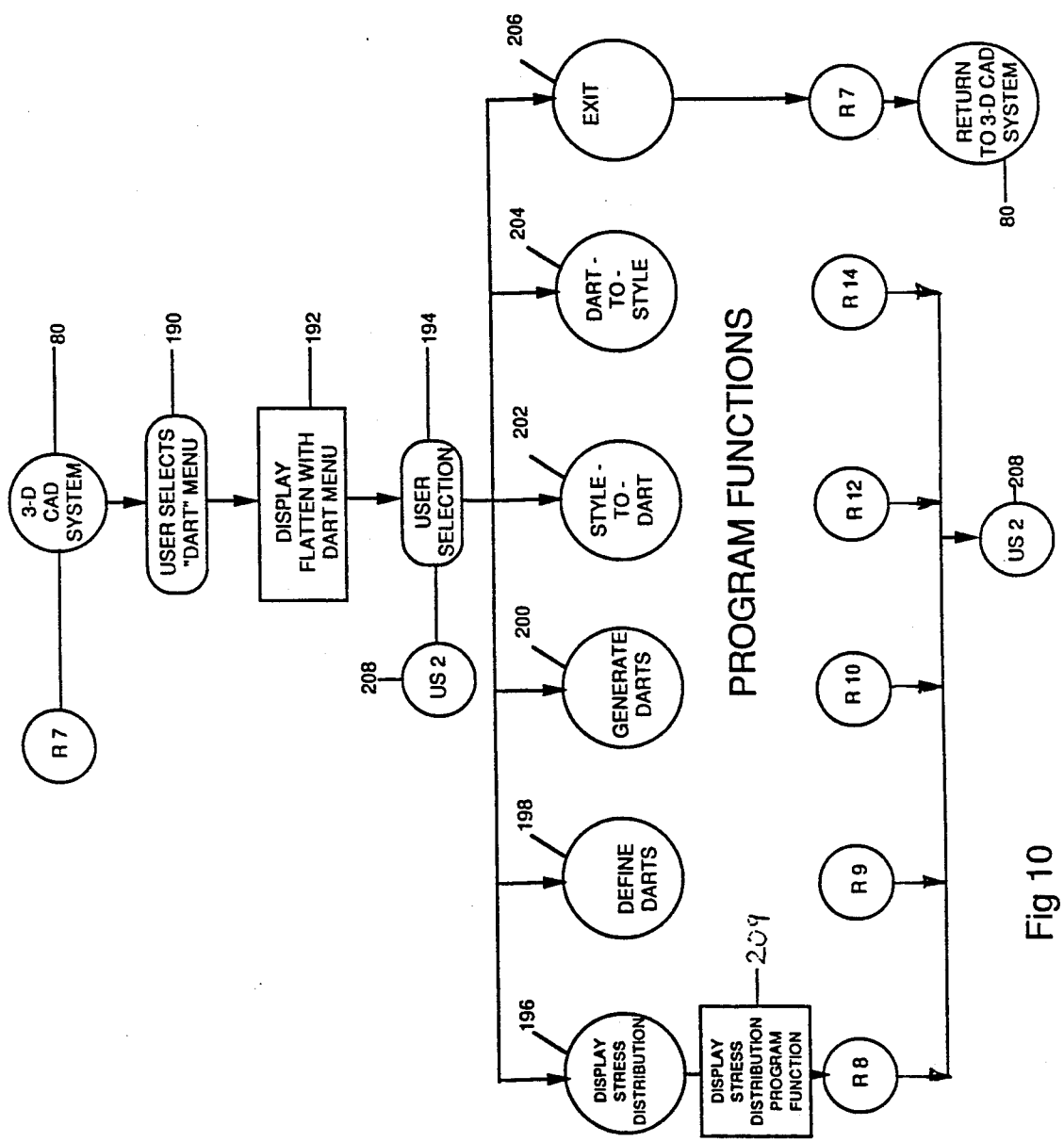
FIG. 10 is a flow chart illustrating the pattern flattening with darts function of the present invention.

FIG. 10 illustrates the main flow chart for the "flatten with darts" function and outlines the function that allows the user to retrieve stress distribution data of a previously-flattened surface and to define, generate, retrieve and store darts in the flat pattern from a menu displayed on the system. The "flatten with darts" function is invoked from the exits to three-dimensional computer-aided design system software 80. Once invoked from the system 80, the function illustrated in FIG. 10 allows the user to select (190, 192, 194) from a menu any of the individual sub-functions 196–204 associated with flattening with darts plus an "exit" 206 function. Once each sub-function 196–204 finishes its task, control is returned to the flatten with darts function illustrated in FIG. 10 indicated by the labels R8–R14. Control is then passed to the menu selection (US2) 208 so that the user may proceed to the next function.

To initiate the "flatten with dart" function, the user will select the "display stress" function 196 which will retrieve (209) from memory the data associated with the flattened pattern pieces and display the outline of the pattern pieces to allow the user to pick the particular flat pattern piece of interest. The function then displays the selected pattern and its tension and compression stress distribution on display 26. The procedure for adding darts to a flat pattern is further developed by invoking either the "define darts" function 198 or by converting existing style lines in the 3-D surface to darts in the flat pattern by invoking the "style-to-dart" function 202.

Figure 11:
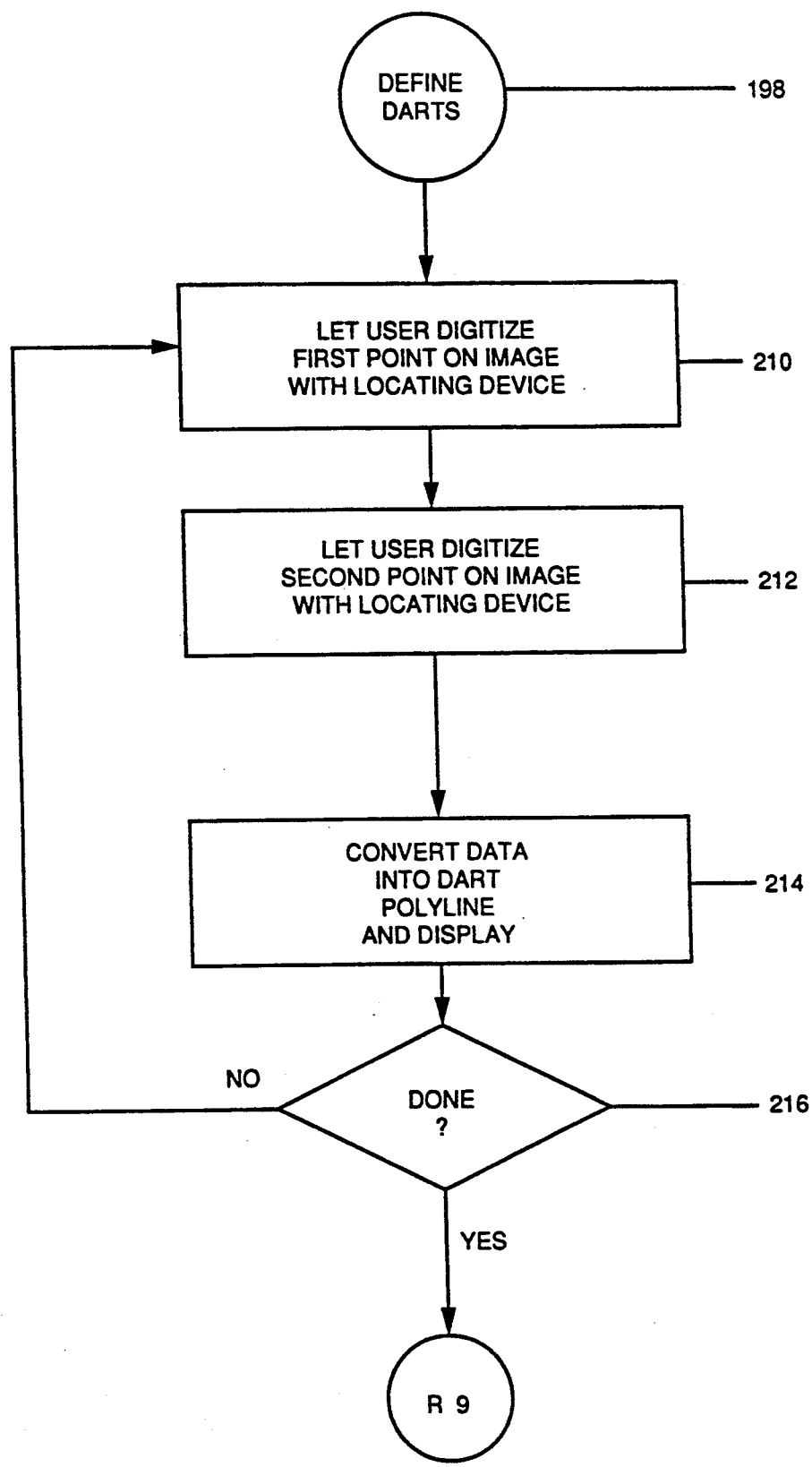
FIG. 11 is a flow chart illustrating the "define darts" function of the present invention.

The flow chart for the define darts function is illustrated in FIG. 11. The function lets the user digitize (210, 212) first and second points on the image with a locating device such as light pen 28 or mouse 30. The function then converts (214) the digitize points into a dart polyline and displays the line on the pattern image. The function determines (216) if any additional darts are to be defined and if so returns control to 210.

Figure 13:
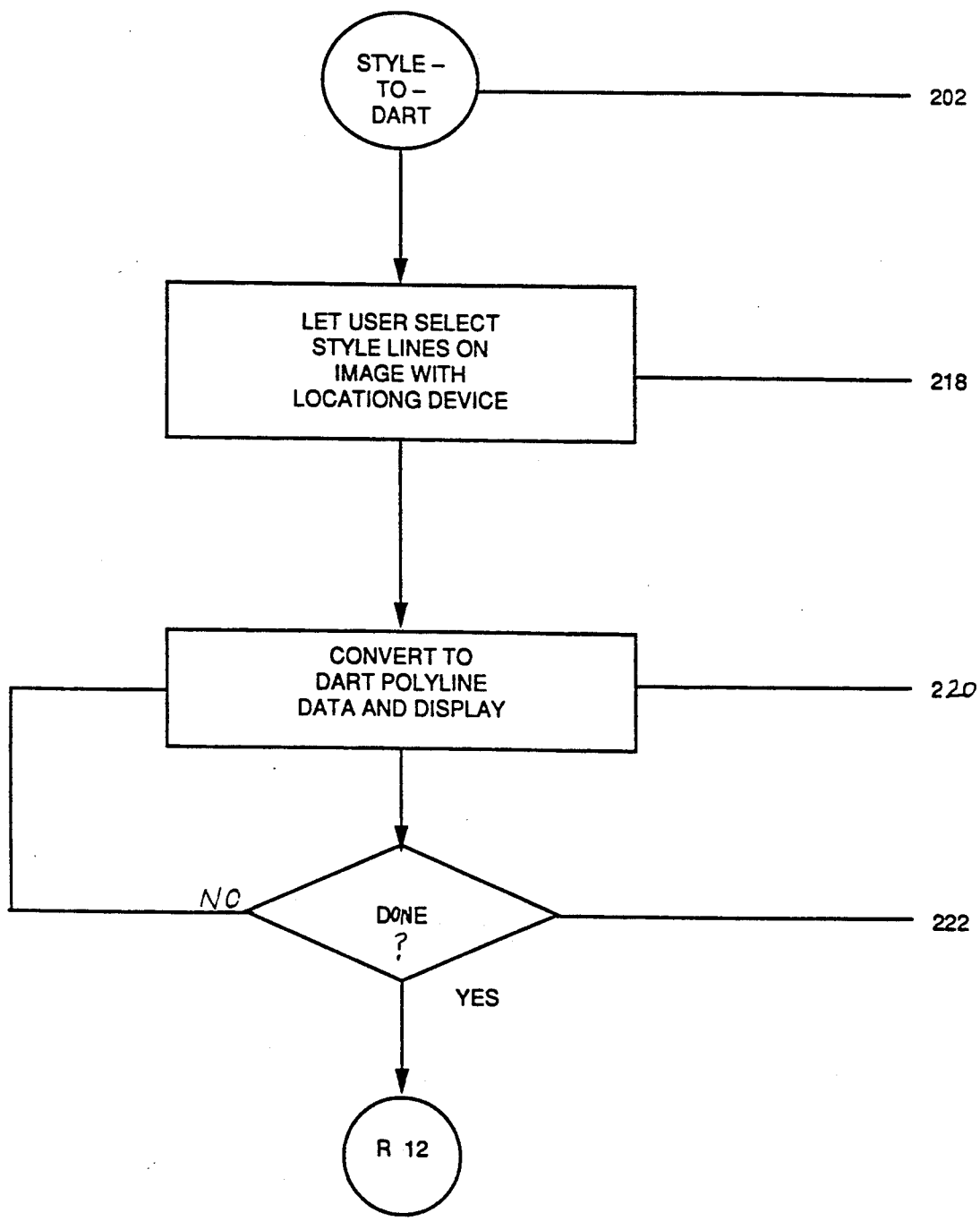
FIG. 13 is a flow chart illustrating the "style-to-dart" function of the present invention.

The flow chart for mapping selected style lines from the 3-D image to the 2-D plane as polylines on the pattern is illustrated in FIG. 13. The "style-to-dart" function lets the user select (218) a style line on the 3-D image with a locating device and convert (220) the style line to a dart polyline data by mapping the coordinates of the line from 3-D space to the 2-D plane using bilateral conformal mapping. The dart is displayed on the flat pattern outline. The function then determines at 222 whether the user desires to select additional style lines.

Figure 12A:
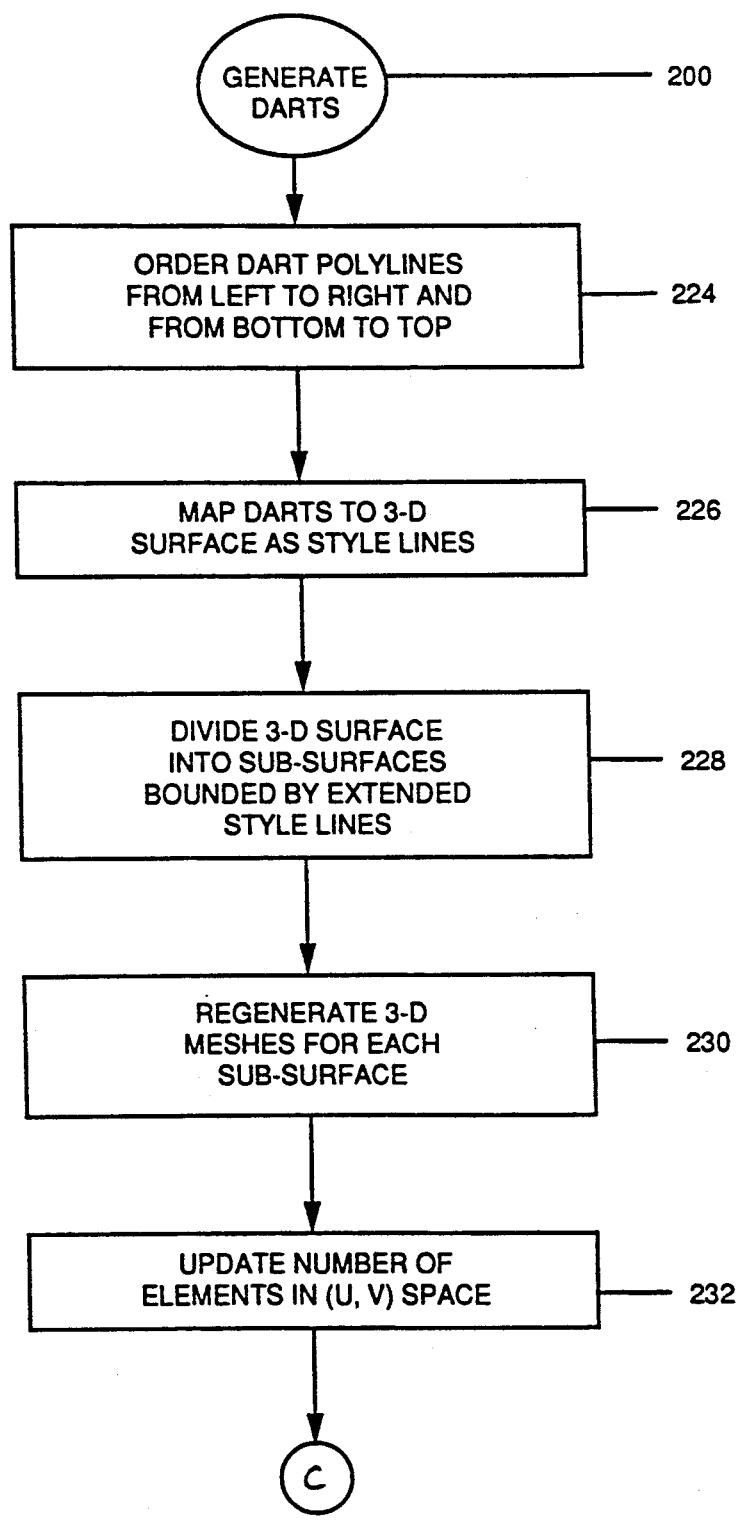
FIGS. 12a-12c are flow charts illustrating the "generate darts" function of the present invention.
Figure 12B:
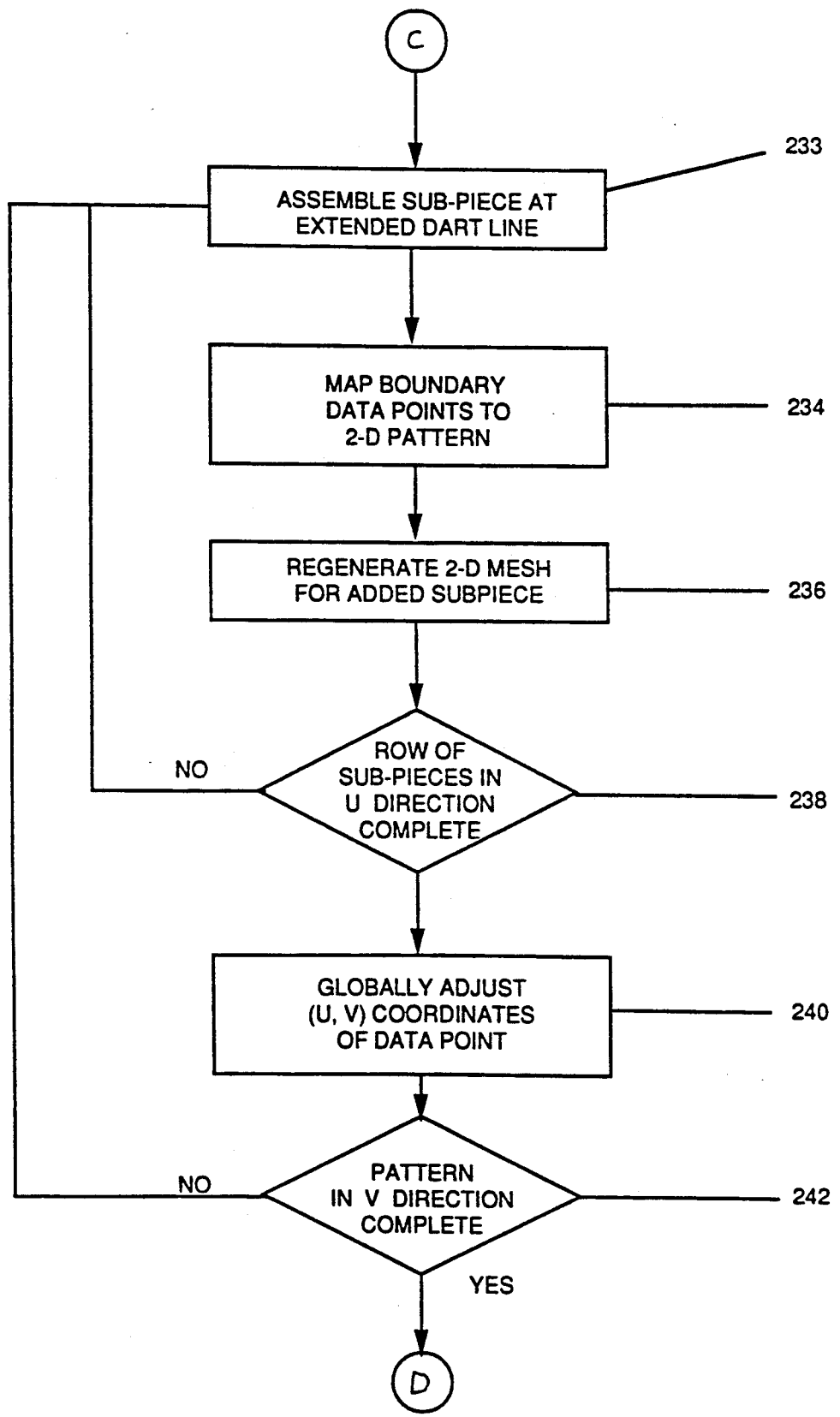
Figure 12C:
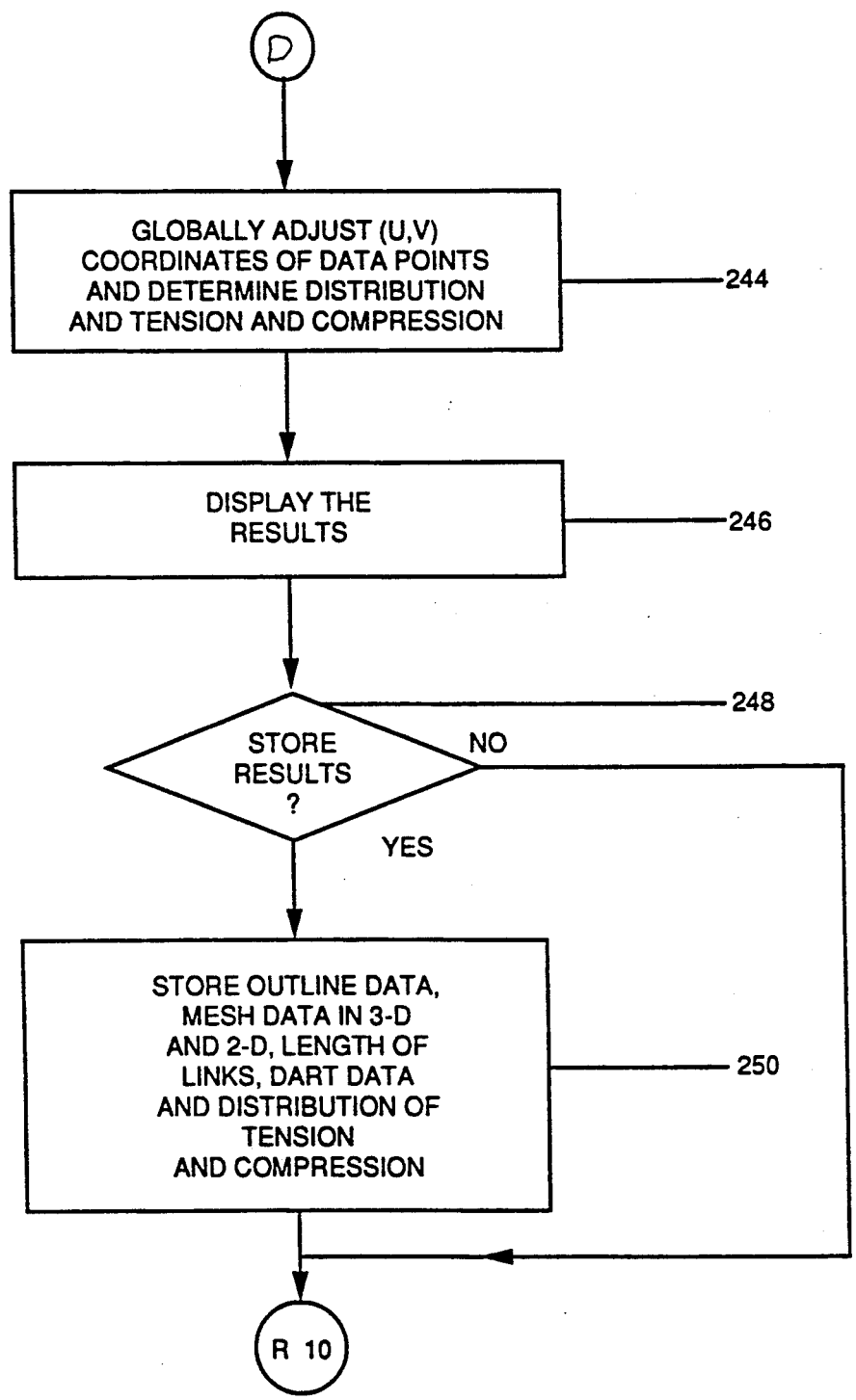

The flow chart for the function which generates darts from polylines established by functions 198 and 202 is illustrated in FIGS. 12a–c. As an initial step, the function orders (224) the dart polylines from left-to-right and top-to-bottom. The function then maps (226) the darts to the 3-D surface as style lines, using bilinear conformal mapping, and divides (228) the 3-D surface into sub-surfaces which are bound by the style lines. The style lines in the 3-D space are extended to traverse the entire surface. Using the extended style lines as boundaries, the function regenerates (230) the 3-D meshes for each sub-surface and updates (232) the number of elements in the (U,V) space. The sub-piece is assembled (233) to the growing pattern of sub-pieces, just as a large element is assembled to a growing pattern in the flattening function, by mapping the sub-piece to the 2-D plane and translating the sub-piece in the plane to the boundary of the growing pattern.

However, when the sub-piece is assembled to the growing pattern, it is connected only at the extended portion of the dart line and is not connected at the dart line. Because the sub-piece may be distorted at the extended dart line when it is assembled to the growing pattern, the function maps (234) the boundary data points from the 3-D space to the 2-D image and regenerates (236) the 2-D mesh for the added sub-piece. If the function determines at 238 that the added sub-piece completes a row of sub-pieces in the U direction, the function globally adjusts (240) the (U,V) coordinates of the data points generated at 236. When the function determines (242) that the pattern is also complete in the V direction, the function once again globally adjusts (244) the (U,V) coordinates of the data points to further flatten the pattern containing one or more darts, and determines the distribution of tension and compression stress. The result of the addition of the dart or darts is displayed (246), including the distribution of tension and compression stress, to apprise the user of the effect of the addition of the dart or darts. The user is queried at 248 whether the results are to be stored and if so, the outline data, 3-D and 2-D mesh data, length of the links, dart data and distribution of tension and compression data are transferred to hard disk 36.

Figure 14:
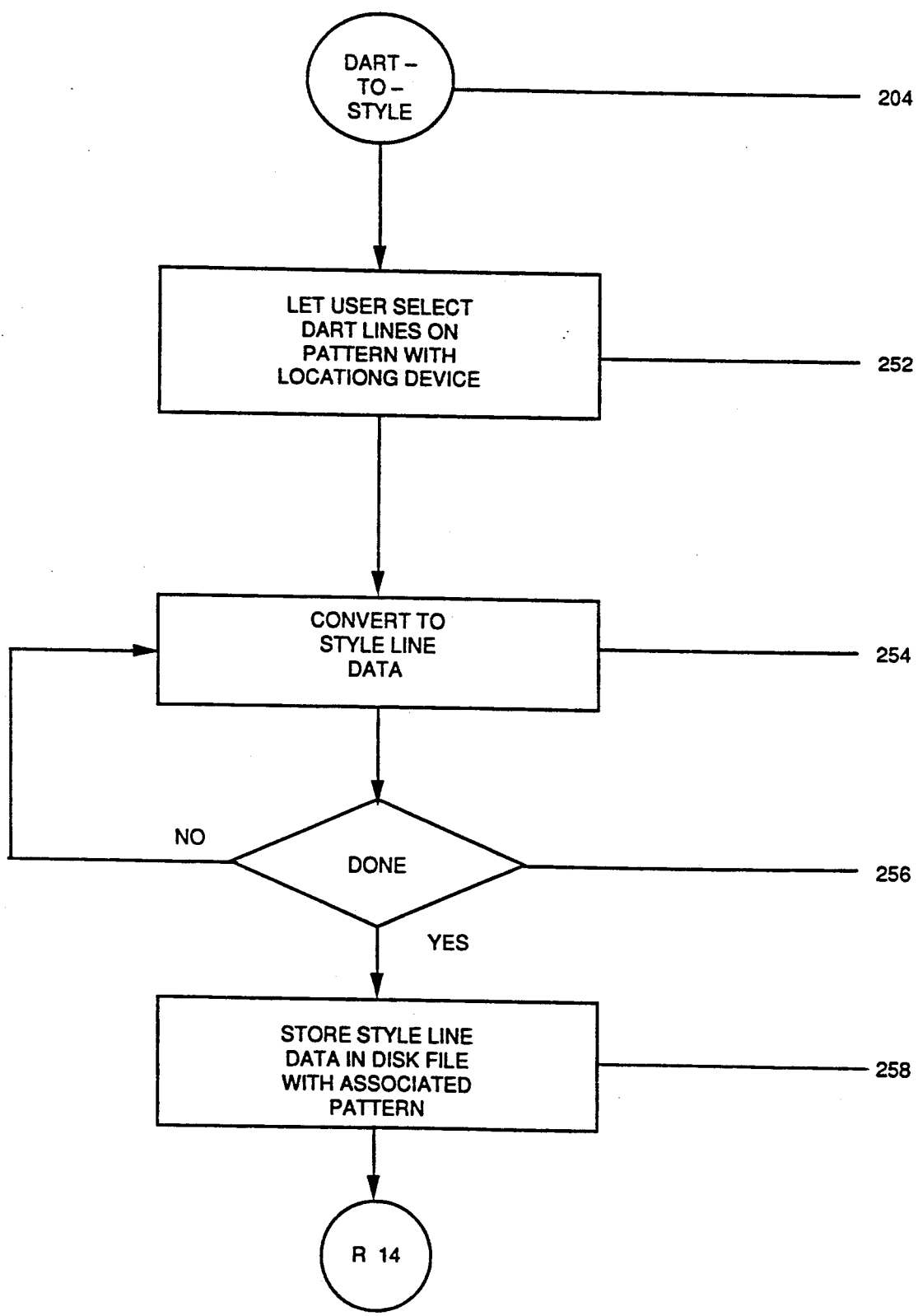
FIG. 14 is flow chart illustrating the "dart-to-style" function of the present invention.

FIG. 14 illustrates the "dart-to-style" function which allows the user to select (252) a desired dart line on the pattern with a locating device and converts (254) the dart line to a style line on the 3-D image by conformal mapping. The function then determines at 256 whether the user desires to select another dart and, if not, the style line data is stored (258) on disk 36 with the associated pattern.

The procedure for dividing a surface into sub-surfaces utilizing darts and extended dart lines computationally replaces the style and extended style line with a layer of zero-thickness elements. This layer of zero-thickness elements is assembled in the 2-D plane to the growing pattern at the dart and extended dart line. The elements on the extended dart line are constrained to zero-thickness. The elements on the dart line, however, are allowed to expand as required at the location of the dart and are not constrained. This allows the pattern to expand at the dart to relieve the tension or compression stress.

Figure 15:
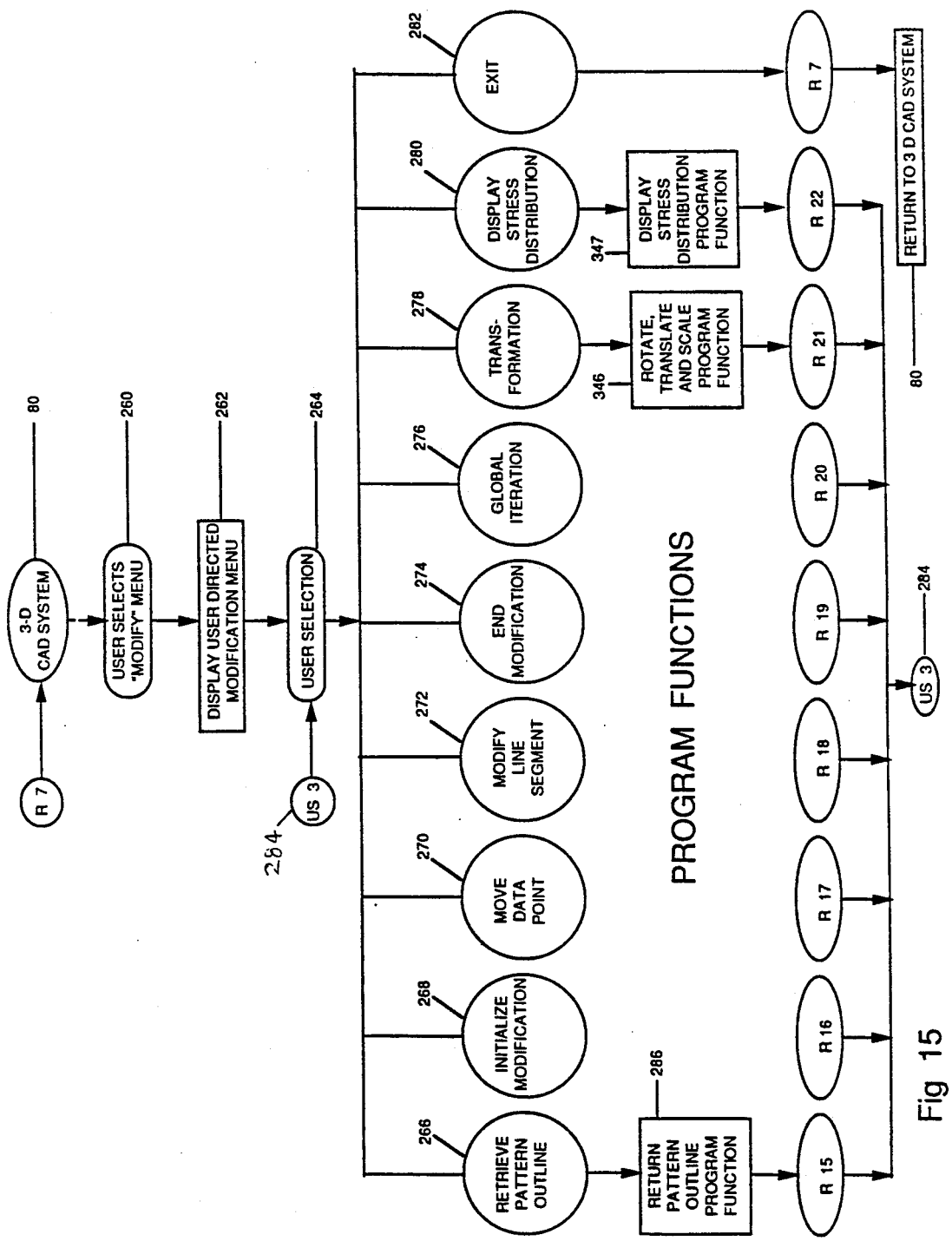
FIG. 15 is a flow chart illustrating the user-directed modification function of the present invention.

FIG. 15 illustrates the main flow chart for the "user-directed modification" function and outlines a function that allows the user to retrieve a previously-flattened pattern, manually modify the outline of the pattern and apply additional global iteration to a pattern. That function as a whole is invoked from the exits to standard three-dimensional computer-aided design software 80 and allows the user to select (260, 262, 264) from a menu of individual sub-functions 266–280, plus and "exit" function 282. Each of the sub-functions 266–280 execute some part of the "user-directed modification" function and once each of these sub-functions finishes its task, control is returned to the user-directed modification function illustrated in FIG. 15, indicated by labels R15–R22. Control is then passed back to the menu selection (US3) so that the user may proceed to the next function.

Figure 16:
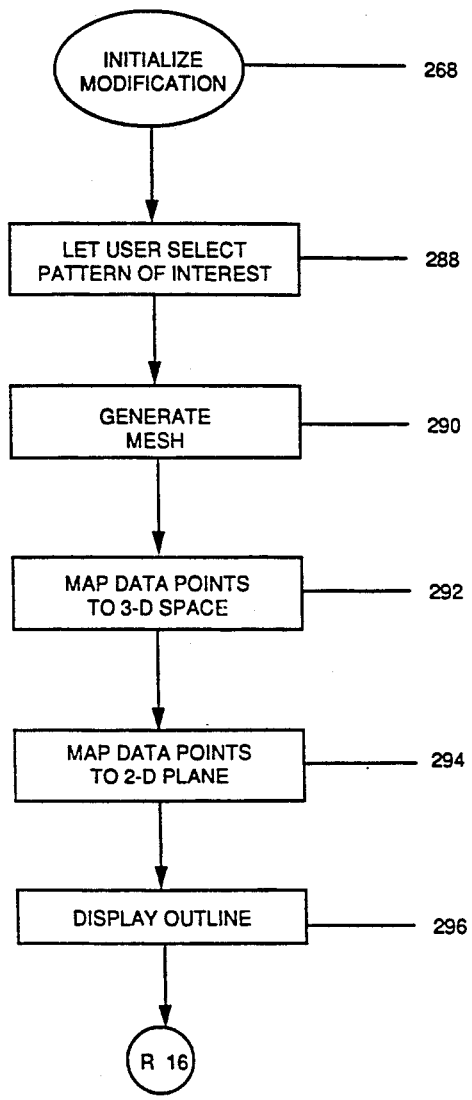
FIG. 16 is a flow chart illustrating the "initialized modification" function of the present invention.

When "retrieve pattern outline" function 266 is invoked, the function retrieves (286) the outline data points for all of the patterns previously flattened and stored in memory and displays the outlines on CRT 26. FIG. 16 illustrates the flow chart for the "initialized modification" function. When the user invokes this function, the function lets the user select (288) the pattern of interest with a locating instrument. The function then generates (290) a mesh on the selected pattern by redistributing the data points uniformly on the outline and establishing the interior data points of the mesh from these uniform boundary data points. The (U,V) coordinates of the mesh are mapped at 292 to the 3-D space using bilinear conformal mapping to determine the (U,V) coordinates for each style line and mapped (294) back to the 2-D plane to establish the (U,V) coordinates for each dart. The function then displays (296) the outline of the pattern of interest along with the newly-generated mesh and dart lines that were stored with the pattern.

Figure 17:
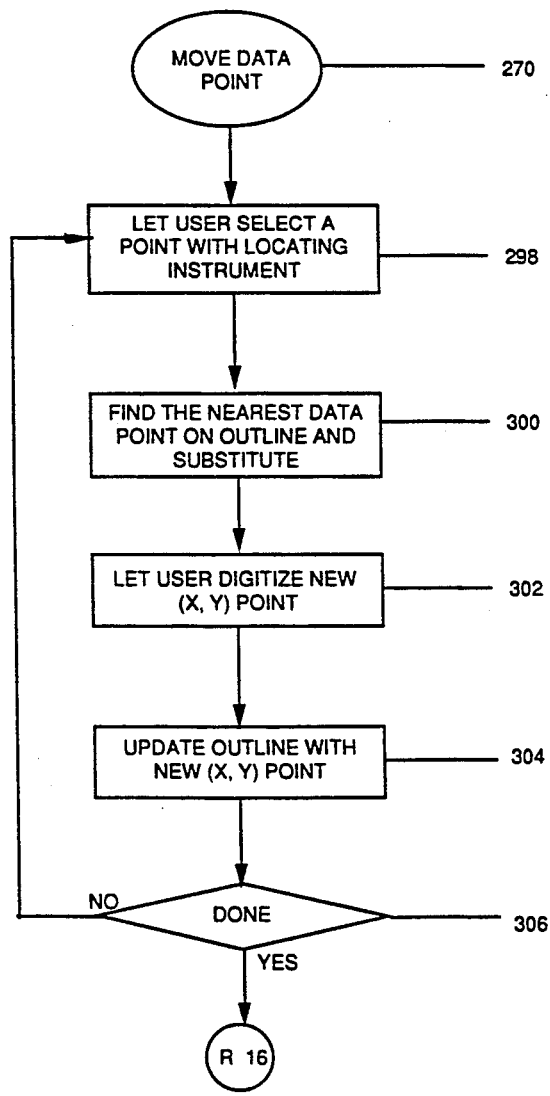
FIG. 17 is a flow chart illustrating the "move data point" function of the present invention.

FIG. 17 illustrates the flow chart for the "move data point" function. The function lets the user select (298) a point on the pattern image displayed on the CRT with a locating instrument and finds (300) the nearest data point on the pattern outline, which is substituted for the user-selected point in 298. The function then lets the user digitize (302) a new point and updates (304) the pattern outline with the new point. The function then determines at 306 whether the user is interested in selecting another point and, if so, returns control to 298.

FIG. 18 illustrates the flow chart for the "modify lines segment" function. The function lets the user select (308, 310) first and second points with a locating instrument. The function then finds (312) the outline data points nearest the two selected by the user and replaces (314) the portion of the outline between the two points with a straight line. This line divides the pattern into two portions. The function then lets the user select (316) one of the two portions of the pattern with a locating instrument and lets the user digitize (318) a third point to which one end of the line newly constructed in 314 is to be moved. The function moves (320) the closest end of the line to the point digitized at 318. The function then determines (322, 324) whether the user desires to move the other end of the straight line and whether the user wishes to repeat the function to modify another portion of the pattern outline.

Figure 19:
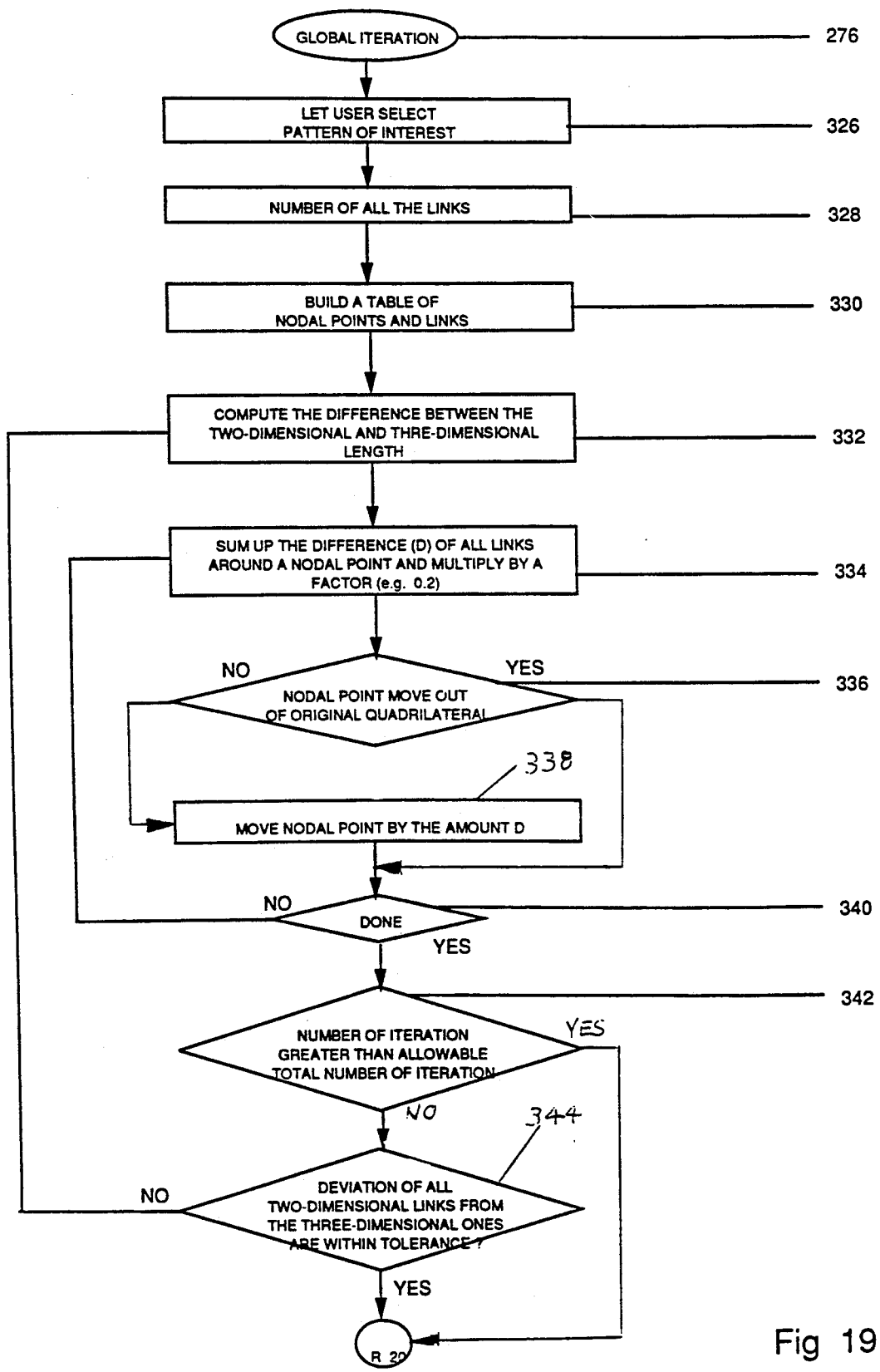
FIG. 19 is a flow chart illustrating the "global iteration" function of the present invention.

If the user wishes to apply additional flattening to a surface displayed on CRT 26, the "global iteration" function 276 is invoked, the flow chart of which is illustrated in FIG. 19. The function lets the user select (326) the pattern of interest with a locating instrument. The function numbers (328) the links and builds (330) a table of nodal points and links. The function then computes (332) the difference between the length of each link in the two-dimensional plane and the three-dimensional space and sums up (334) the difference of the links associated with a particular nodal point. The net difference is multiplied by a factor, designated D, which is 0.2 in the preferred embodiment. Factor D, which represents the net difference in the length of the links surrounding the particular nodal point along a particular axis, provides the "global tendency" of that point to move when mapped from the 3-D image to the 2-D plane. The control determines at 336 whether an adjustment of the nodal points by the factor D would cause the nodal point to move outside of its original quadrilateral. If so, then the location of the nodal point in the 2-D image is not adjusted. If the moving of the nodal point by the amount D would not cause it to move outside of its original quadrilateral then the position of the point is adjusted. The function then determines at 340 whether all nodal points have been adjusted and if so determines at 342 whether the number of iterations performed is greater than the number specified by the user. If so, then control is returned to the function illustrated in FIG. 15. If the function determines at 342 that the number of iterations performed is not greater than the total number specified by the user, the control then determines at 344 whether the deviations of all of the two-dimensional lengths from the three-dimensional lengths are within a predetermined tolerance. If not, control returns to 332 for another iteration. If, however, the deviations of all the lengths are within the predetermined tolerance, control passes back to the function illustrated in FIG. 15.

The user-directed modification function additionally allows the user to invoke the transformation sub-function 278 which will allow the user to rotate, translate and scale the pattern images as desired. The user-directed modification menu additionally provides a display stress distribution sub-function 280 which displays the stress distribution in the same manner provided by the flow chart illustrated in FIG. 6.

To terminate the "user-directed modification" function, the user invokes the "end modification" function, the flow chart of which is illustrated in FIG. 20. The end modification function generates (350) a mesh on the pattern outline using evenly distributed boundary data points. Using bilinear conformal mapping, the function maps (352, 354) dart lines to 3-D space and style lines to 2-D plane. The modified outlines are displayed (356) on CRT 26 and the user is queried at 358 whether the file for the pattern is to be updated with the modifications. If so, the pattern file data are updated (360).

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of generating a two-dimensional pattern image that approximates a three-dimensional pattern image that approximates a three-dimensional surface mapped to a flat plane and displayed on a graphic display using a computer-assisted design system having at least one graphic display comprising:

generating a three-dimensional mesh conforming to the topology of the three-dimensional surface, said mesh including lines intersecting at nodal points, said lines defining polygonal elements between said nodal points;

mapping one of said polygonal elements to a location in said flat plane where said one of said polygonal elements will share at least one side with another one of said polygonal elements previously mapped to said flat plane;

distorting the length of the shared side to conform to the length of the share side of said another said polygonal element;

comparing the distance between one of said nodal points and an adjacent nodal point on said three-dimensional surface with the distance between the same said nodal points in said flat plane after said step of distorting;

adjusting the position of said one of said nodal points in said flat plane in response to the results of said step of comparing; and displaying said polygonal elements in said flat plane on said at least one graphic display.

2. The method of generating a two-dimensional pattern image in claim 1 further including comparing the length of each said side in said three-dimensional space with the length of the corresponding side after said step of adjusting and displaying the difference between the lengths of said sides.

3. The method of generating a two-dimensional pattern image in claim 2 in which said difference is displayed by assigning a color hue to the respective side displayed on said graphic display.

4. The method of generating a two-dimensional pattern image in claim 1 further including receiving a user selection of points on the pattern image defining an opening in the pattern and mapping said opening to said three-dimensional surface to define an altered three-dimensional surface.

5. The method of generating a two-dimensional pattern image in claim 4 further including mapping said altered three-dimensional image to said flat plane.

6. A method of generating a two-dimensional pattern image that approximates a three-dimensional surface mapped to a flat plane and displayed on a graphic display using a computer-assisted design system having at least one graphic display comprising:
  generating a three-dimensional mesh conforming to the topology of the three-dimensional surface, said mesh including lines intersecting at nodal points, said lines defining polygonal small elements between said nodal points;
  grouping said polygonal small elements into polygonal large elements, each said polygonal large element including a predefined plurality of said polygonal small elements and defining polygonal large element data points at the intersection of the sides of said polygonal large elements;
  mapping one of said polygonal large elements to said flat plane;
  assembling said one of said polygonal large elements to another large element at a location in said flat plane where said one of said polygonal large elements will share at least one side with said another one of said polygonal large elements;
  distorting the length of the shared side to conform to the length of the shared side of said another one of said polygonal large elements;
  comparing the distance between one of said data points and an adjacent data point on said three-dimensional surface with the distance between the same said data points in said flat plane after said step of distorting;
  adjusting the position of said one of said data points in said flat plane in response to the results of said step of comparing; and
  displaying said polygonal elements in said flat plane on said at least one graphic display.

7. The method of generating a two-dimensional pattern image in claim 6 further including recursively repeating said steps of comparing and adjusting.

8. The method of generating a two-dimensional pattern image in claim 6 including repeating said steps of mapping and assembling for all said polygonal large elements and repeating said steps of comparing and adjusting for all said data points.

9. The method of generating a two-dimensional pattern image in claim 8 further including generating a two-dimensional mesh in each of said large elements in said flat plane, said two-dimensional mesh defining plane nodal points corresponding to said nodal points on said three-dimensional surface, further comparing the distance between one of said nodal points in said three-dimensional space with the distance between the corresponding plane nodal point and the plane nodal points adjacent said plane nodal point and adjusting the position of said plane nodal point in response to the results of said step of further comparing.

10. The method of generating a two-dimensional pattern image in claim 6 further including receiving a user selection of points on the pattern image defining an opening in the pattern and mapping said opening to said three-dimensional surface to define an altered three-dimensional surface.

11. The method of generating a two-dimensional pattern image in claim 10 further including mapping said altered three-dimensional image to said flat plane.

12. A computer-assisted design apparatus for generating a two-dimensional pattern image that is an approximation of a flattened three-dimensional surface, said pattern image being displayed on a graphic display comprising:
  a programmed computer including at least one graphic display and corresponding display buffer for storing an image, said three-dimensional surface defined by data points in said computer;
  generating means for generating a three-dimensional mesh conforming to the topology of the three-dimensional surface, said mesh including intersecting lines defining polygonal elements between said lines;
  mapping means for mapping said polygonal elements to a two-dimensional flat plane, the polygonal elements in said flat plane being displayed on said graphic display;
  assembling means for assembling said polygonal elements in a pattern in said flat plane, wherein each polygonal element shares a common side with an adjacent polygonal element, by translating said polygonal elements toward each other and distorting the length of each side shared with another polygonal element to conform to the length of the shared side of the other said polygonal element;
  stress determining means for determining the differences between the distance separating pairs of said data points on said three-dimensional surface with the distance separating the corresponding pairs of data points in said flat plane;
  stress indicating means for indicating the value of said difference on said pattern image being displayed on one said graphic display; and
  stress reducing means for varying the distance separating selected pairs of said data points, whereby said stress indicating means will indicate the results of operating said stress reducing means.

13. The computer-assisted design apparatus in claim 12 in which said stress reducing means includes dart generating means for creating openings in a pattern image and means for mapping openings to a corresponding three-dimensional surface, whereby data points adjacent openings created in the pattern image will be redistributed in said flat plane after said mapping means maps the three-dimensional surface having openings to said flat plane.

14. The computer-assisted design apparatus in claim 12 in which said mapping means includes translating means for translating a polygonal element defined by a plurality of data points in said flat plane and means for adjusting the distance separating data points in said polygonal elements, whereby a pattern may be constructed by assembling polygonal elements a row at a time and a dimension of a polygonal element may be adjusted to match a corresponding dimension of a polygonal element to which it is being assembled.

15. The computer-assisted design apparatus in claim 14 in which said stress reducing means includes global adjusting means for comparing the net difference in the distance separating a data point and its adjacent data points on the three-dimensional surface with the net difference in the distance separating the same data point and its adjacent data points in flat plane and means for translating the same data point in said flat plane according to the result of the comparison.

16. The computer-assisted design apparatus in claim 15 in which said stress reducing means further includes dart generating means for creating openings in a pattern image and means for mapping openings to a corresponding three-dimensional surface, whereby data points adjacent openings in the pattern will be redistributed in said flat plane after said mapping means maps the three-dimensional surface having openings to said flat plane.

17. The computer-assisted design apparatus in claim 15 in which said mapping means includes means for grouping a plurality of adjoining ones of said polygonal elements into a polygonal large element and means for adjusting the distance separating data points defining said polygonal large elements, whereby a pattern image may be constructed by assembling polygonal large elements a row at a time by adjusting a dimension of a polygonal large element to match a corresponding dimension of a polygonal large element to which it is being assembled and applying said global adjusting means to said row of polygonal large elements.

18. The computer-assisted design apparatus in claim 17 further including mesh generating means for generating a mesh for said large elements in said plane, said mesh generating means being responsive to data points on the boundary of the respective said large element mapped thereto by said mapping means to generate the interior data points defining generated elements, whereby said global adjusting means may be applied to the points defined by said mesh generating means with respect to corresponding interior data points of the respective large element on the three-dimensional surface.

19. A computer-assisted design apparatus for generating a two-dimensional pattern image that approximates a three-dimensional surface mapped to a flat plane comprising:

generating means for generating a three-dimensional mesh conforming to the topology of the three-dimensional surface, said mesh including lines intersecting at nodal points, said lines defining polygonal elements between said nodal points;

mapping means for mapping said nodal points of said polygonal elements to said flat plane, said polygonal elements defined in said flat plane by sides extending between said nodal points mapped to said flat plane;

assembling means for assembling said polygonal elements in a pattern in said flat plane wherein each polygonal element shares a common side with an adjacent polygonal element by translating said polygonal elements toward each other and distorting the length of each side shared with another polygonal element to conform to the length of the shared side of the other said polygonal element;

comparison means for comparing the distance between said nodal points on said three-dimensional surface with the distance between said nodal points in said flat plane;

global adjusting means for adjusting the position of said nodal points in said flat plane responsive to said comparison means; and graphic display means for displaying said polygonal elements in said flat plane.

20. The computer-assisted design apparatus for generating a two-dimensional pattern image in claim 19 further including stress determining means for comparing the length of said sides on said three-dimensional surface with the length of the corresponding said sides in said flat plane and displaying the difference between said lengths.

21. The computer-assisted design apparatus for generating a two-dimensional pattern image in claim 20 including means for assigning a color hue to said sides displayed on said graphic display indicative of said difference.

22. A computer-assisted design apparatus for generating a two-dimensional pattern image that approximates a three-dimensional surface mapped to a flat plane comprising:

generating means for generating a three-dimensional mesh conforming to the topology of a three-dimensional surface, said three-dimensional mesh including lines intersecting at nodal points, said lines defining polygonal small elements between said nodal points;

grouping means for grouping said polygonal small elements into polygonal large elements such that each of said polygonal large elements includes a predefined plurality of said polygonal small elements and define polygonal large element data points at the intersection of the sides of said polygonal large elements;

mapping means for mapping said polygonal large element data points to said flat plane, said polygonal large elements defined in said flat plane by sides extending between polygonal large element data points mapped to said flat plane;

assembling means for assembling said polygonal large elements together in a pattern in said flat plane with adjacent ones of said polygonal large elements sharing at least one side;

distorting means for distorting the length of the shared sides to conform to adjoining polygonal large elements;

comparison means for comparing the distance between said polygonal large element data points in said three-dimensional space with the distance between said polygonal large element data points in said flat plane;

adjusting means for adjusting the position of said polygonal large element data points in said plane responsive to said comparison means; and a graphic display and display buffer adapted to displaying said polygonal elements in said flat plane.

23. The computer-assisted design apparatus for generating a two-dimensional pattern image in claim 22 further including second generating means for generating a two-dimensional mesh in said polygonal large elements in said flat plane, said two-dimensional mesh defining plane nodal points corresponding to said nodal points on said three-dimensional surface, second comparison means for comparing the distance between said nodal points on said three-dimensional surface with the distance between the corresponding plane nodal points and second adjusting means for adjusting the position of said plane nodal point responsive to said second comparison means.

* * * * *

UNITED STATES PATENT AND TRADEMARK OFFICE
CERTIFICATE OF CORRECTION

PATENT NO. : 5,107,444

DATED : April 21, 1992

INVENTOR(S) : Chien T. Wu

It is certified that error appears in the above-identified patent and that said Letters Patent is hereby corrected as shown below:

```
Column 2, line 50:
    After "the" insert --2-D plane
    and assembling the flat pattern,
    the smaller,--.

Column 12, line 50:
    "plus and" should be --plus an--.

Column 14, line 38, claim 1:
    After "three-dimensional"
    delete --pattern image that
    approximates a three-dimensional--.

Column 15, line 67, claim 9:
    After "points" insert
    --and the nodal points adjacent
    said one of said nodal points--.

Column 16, line 46, claim 12:
    "difference" should be --differences--.
```

Signed and Sealed this

Twenty-second Day of February, 1994

Attest:

BRUCE LEHMAN

*Attesting Officer*    *Commissioner of Patents and Trademarks*